US011113565B2

(12) United States Patent
Shrestha et al.

(10) Patent No.: US 11,113,565 B2
(45) Date of Patent: Sep. 7, 2021

(54) SYSTEMS AND METHODS FOR INTELLIGENT AND INTERPRETIVE ANALYSIS OF SENSOR DATA AND GENERATING SPATIAL INTELLIGENCE USING MACHINE LEARNING

(71) Applicant: Ambient AI, Inc., Palo Alto, CA (US)

(72) Inventors: Shikhar Shrestha, Palo Alto, CA (US); Vikesh Khanna, Palo Alto, CA (US)

(73) Assignee: Ambient AI, Inc., Palo Alto, CA (US)

( * ) Notice: Subject to any disclaimer, the term of this patent is extended or adjusted under 35 U.S.C. 154(b) by 0 days.

(21) Appl. No.: 16/816,907

(22) Filed: Mar. 12, 2020

(65) Prior Publication Data

US 2020/0210762 A1     Jul. 2, 2020

Related U.S. Application Data

(62) Division of application No. 16/408,937, filed on May 10, 2019, now Pat. No. 10,628,706.

(60) Provisional application No. 62/670,616, filed on May 11, 2018.

(51) Int. Cl.
| | |
|---|---|
| *G06K 9/62* | (2006.01) |
| *G06N 20/20* | (2019.01) |
| *G06K 9/00* | (2006.01) |
| *G06K 9/72* | (2006.01) |
| *G06N 5/02* | (2006.01) |

(52) U.S. Cl.
CPC ....... *G06K 9/6232* (2013.01); *G06K 9/00362* (2013.01); *G06K 9/72* (2013.01); *G06N 5/02* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 8,068,986 B1 | 11/2011 | Shahbazi et al. | |
| 9,665,777 B2* | 5/2017 | Naikal | H04N 7/181 |
| 9,746,988 B2* | 8/2017 | Kim | G08B 13/19671 |
| 9,883,165 B2* | 1/2018 | Denizot | G08B 13/19608 |
| 10,600,297 B2* | 3/2020 | Kerzner | G06T 19/006 |
| 2004/0119819 A1* | 6/2004 | Aggarwal | G06K 9/00771 |
| | | | 348/143 |
| 2006/0268108 A1* | 11/2006 | Abraham | G08B 13/1968 |
| | | | 348/143 |
| 2006/0279630 A1* | 12/2006 | Aggarwal | G01S 3/7864 |
| | | | 348/143 |
| 2011/0164163 A1* | 7/2011 | Bilbrey | G06F 1/1694 |
| | | | 348/333.01 |
| 2011/0249867 A1 | 10/2011 | Haas et al. | |
| 2013/0128050 A1* | 5/2013 | Aghdasi | H04N 7/181 |
| | | | 348/158 |

(Continued)

OTHER PUBLICATIONS

Boufarguine, Mourad, et al. "Virtu4d: a realtime virtualization of reality." 5th International Symposium 3D Data Processing, Visualization and Transmission. 2010. (Year: 2010).*

(Continued)

*Primary Examiner* — Andrae S Allison
(74) *Attorney, Agent, or Firm* — Jeffrey Schox; Diana Lin

(57) ABSTRACT

Systems and methods for augmenting real-time semantic information to a spatial rendering of a predefined space and providing a real-time situational awareness feed.

11 Claims, 11 Drawing Sheets

(56) References Cited

U.S. PATENT DOCUMENTS

| | | | | |
|---|---|---|---|---|
| 2014/0347475 | A1* | 11/2014 | Divakaran | G06K 9/00771 348/135 |
| 2015/0235379 | A1* | 8/2015 | O'Gorman | G06K 9/00718 382/103 |
| 2016/0335808 | A1* | 11/2016 | Novak | G06K 9/46 |
| 2016/0378861 | A1* | 12/2016 | Eledath | G06K 9/00718 707/766 |
| 2017/0054982 | A1* | 2/2017 | Vellore Arumugam | H04N 19/132 |
| 2017/0308753 | A1 | 10/2017 | Wu et al. | |
| 2018/0232937 | A1* | 8/2018 | Moyer | A63F 13/65 |
| 2019/0325230 | A1* | 10/2019 | Nadler | G06K 9/00744 |
| 2020/0184221 | A1* | 6/2020 | Alexander | G06K 9/0063 |

OTHER PUBLICATIONS

Guennoun, Mouhcine, et al. "Augmented reality-based audio/visual surveillance system." 2008 IEEE International Workshop on Haptic Audio visual Environments and Games. IEEE, 2008. (Year: 2008).*

Sebe, Ismail Oner, et al. "3d video surveillance with augmented virtual environments." First ACM SIGMM international workshop on Video surveillance. ACM, 2003. (Year: 2003).*

Mori, S., & Saito, H. (2018). An overview of augmented visualization: Observing the real world as desired. APSIPA Transactions on Signal and Information Processing, 7, E12. doi:10.1017/ATSIP.2018.13 (Year: 2018).*

Boufarguine, Mourand, et al., "Virtu4D: a Real-time Virtualization of Reality", 5th International Symposium 3D Data Processing, Visualization and Transmission, 2010.

Guennoun, Mouhcine, et al., "Augmented Reality-Based Audio/Visual Surveillance System", 2008 IEEE International Workshop on Haptic Audio Visual Environments and Games, IEEE, 2008.

Mori, Shohei, et al., "An Overview of Augmented Visualization: Observing the Real World as Desired", APSIPA Transactions on Signal on Signal and Information Processing 7 (2018).

Sebe, Ismail Oner, et al., "3D Video Surveillance with Augmented Virtual Environments", First ACM SIGMM International Workshop on Video Surveillance. ACM, 2003.

* cited by examiner

SYSTEMS AND METHODS FOR INTELLIGENT AND INTERPRETIVE ANALYSIS OF SENSOR DATA AND GENERATING SPATIAL INTELLIGENCE USING MACHINE LEARNING

CROSS-REFERENCE TO RELATED APPLICATIONS

This application is a divisional of U.S. patent application Ser. No. 16/408,937, filed 10 May 2019, which claims the benefit of U.S. Provisional Application No. 62/670,616, filed 11 May 2018, both of which are incorporated in their entirety by this reference.

TECHNICAL FIELD

This invention relates generally to the computer vision field, and more specifically to a new and useful artificially intelligent image data analysis system in the computer vision field.

BACKGROUND

Defined spaces may include multiple video cameras and provide multiple video feeds from different locations and points of view.

Some modern video analysis techniques may implement computer vision technology that enables automatic detection of objects in video data by a machine rather than relying on a human. In these implementations, the video analysis technique may include a specific detector that may be implemented for identifying a category of object (e.g., instance level detection) within video data. In more advanced implementations, for a single computer vision task, such as object detection, pose estimation, or scene segmentation, a general model for the single computer vision task may be implemented for accomplishing the discrete computer vision tasks. While such implementations may function to enable automated detections within video data, the discrete detection and analysis method fails to provide comprehensible and actionable detections.

Thus, there is a need in the computer vision and security fields to create a new and useful image data analysis and event detection system for intelligently detecting events of interest and providing a comprehensive interpretation of the detected events. The embodiments of the present application provide such new and useful systems and methods.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

Overview

As discussed in the Background section of the present application, existing video analysis and surveillance systems fail to provide actionable intelligence and detections from video to enable real-time or near real-time responses to events of interest and/or time-sensitive events.

The embodiments of the present application, however, address these technical deficiencies of the existing technologies. Specifically, one or more embodiments of the present application provide a combined machine learning model core (e.g., 121 shown in FIG. 1) that functions to comprehend a scene, viewed from the perspective of a video camera or the like, in a holistic manner rather than examining a scene according to discrete analysis tasks at a time. The combined machine learning model core may, in some embodiments, implement a plurality of video analysis models capable of performing distinct computer vision tasks and feature detection.

Using the combined machine learning model, the one or more embodiments of the present application may function to process many aspects of video input, in parallel or synchronously, to achieve comprehensive detection results in real-time. In this way, the feature outputs of the combined machine learning model core may be composited in such a manner to extract mutual information (e.g., where information of feature outputs overlap) existing between distinct feature outputs from each of the distinct video analysis models within the combined model core.

The embodiments of the present application may leverage the identified mutual information (as input data) to derive relationship vectors that may be used by a trained model in generating comprehensive and coherent interpretations of a scene. The generated interpretations may function to enable real-time actionable intelligence with respect to events of interest.

1. System for Artificially Intelligent Image Data Analysis and Feature Detection As shown in FIG. 1, a system 100 for artificially intelligent image data analysis and event detection includes one or more image data sources 110, a comprehension system 120, and a user interface system 130.

Figure 1:
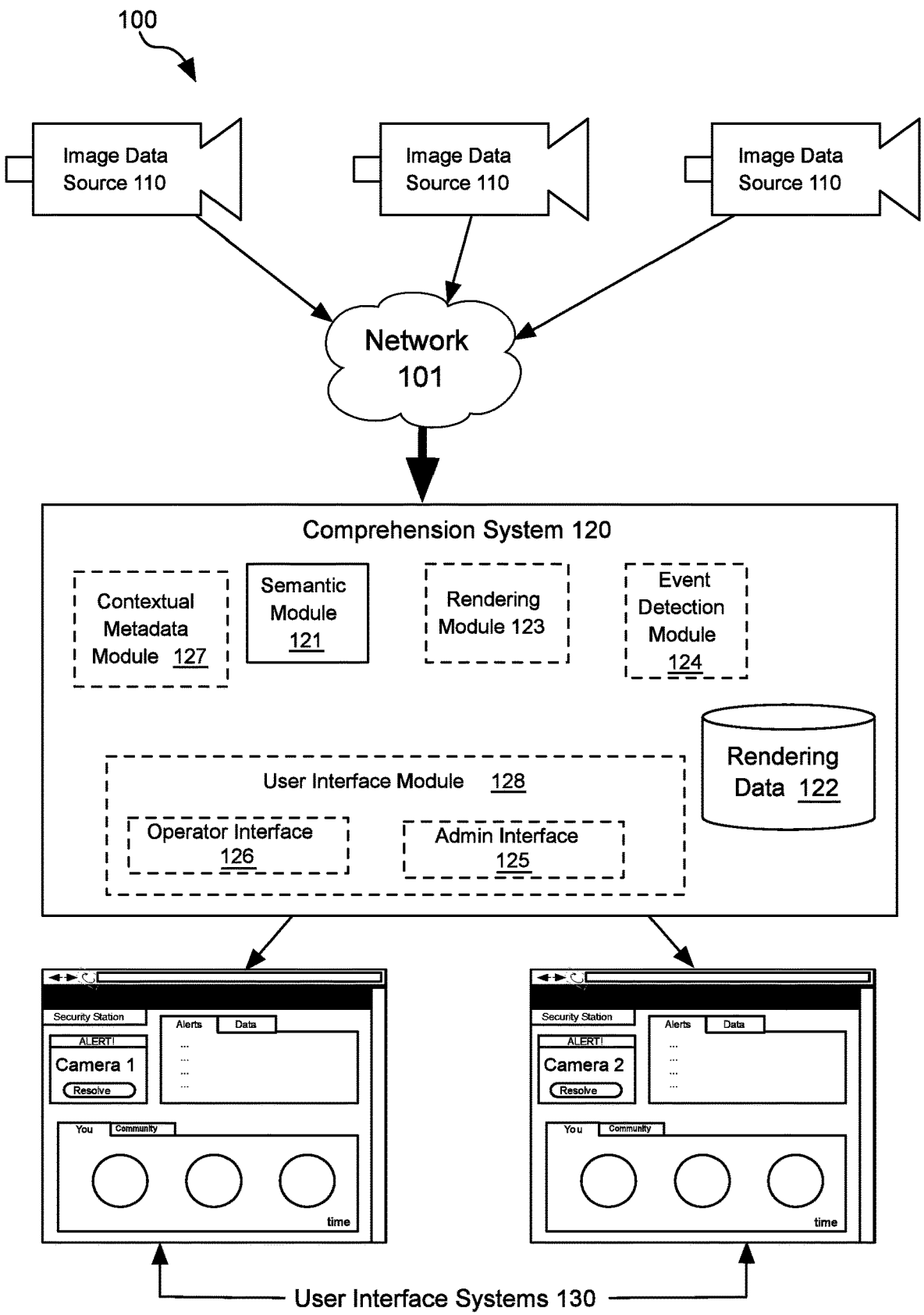
FIG. 1 illustrates a schematic of a system for image data analysis and event detection in accordance with one or more embodiments of the present application.

As shown in FIG. 1, the comprehension system 120 may include a semantic module 121 and rendering data 122. In some embodiments, the comprehension system 120 includes at least one of a rendering module 123, an event detection module 124, a user interface module 128, an operator interface 126, an administration interface 127, and a contextual metadata module 127. In some embodiments, the comprehension system 120 is communicatively coupled to at least one external system that includes at least one of a rendering module 123, an event detection module 124, a user interface module 125, an operator interface 126, an administration interface 127, and a contextual metadata module 127 (e.g., via a network, such as, for example, the Internet or a local network).

In some embodiments, the comprehension system 120 is communicatively coupled to at least one image data source (e.g., 110). In some embodiments, the comprehension system 120 is communicatively coupled to at least one image data source via a network switch. In some embodiments, the comprehension system 120 is communicatively coupled to at least one image data source via a local network (e.g., 101). In some embodiments, the comprehension system 120 is communicatively coupled to at least one image data source via a public network (e.g., the internet). In some embodiments, the comprehension system 120 is communicatively coupled to at least one user interface system (e.g., 130). In some embodiments, at least one user interface system (e.g., 130) is a computer system that is coupled to the comprehension system via network (e.g., the local network 101, a public network, such as, for example, the Internet, and the like). In some embodiments, at least one user interface system (e.g., 130) includes an operator user interface (e.g., a stand-alone computer program, a browser application, etc.) that is communicatively coupled to an operator interface (e.g., 126) included in (or communicatively coupled to) the comprehension system 120. In some embodiments, at least one user interface system (e.g., 130) includes an administrator user interface (e.g., a stand-alone computer program, a browser application, etc.) that is communicatively coupled to an administrator interface (e.g., 126) included in (or communicatively coupled to) the comprehension system 120.

In some embodiments, at least one of the user interface module 128, the operator interface 126 and the administrator interface 125 is an application server that provides an application to at least one user interface system 130, the application functioning to enable a user of the user interface system to operate the comprehension system 120. In some embodiments, the application server is a Web application server.

In some embodiments, the semantic module 121 includes a multi-task model core that instructed to perform native video deep learning on video data received by a plurality of video cameras (e.g., thousands of video cameras), and generate semantic information by processing video from multiple streams locally, and in real-time.

Figure 3:
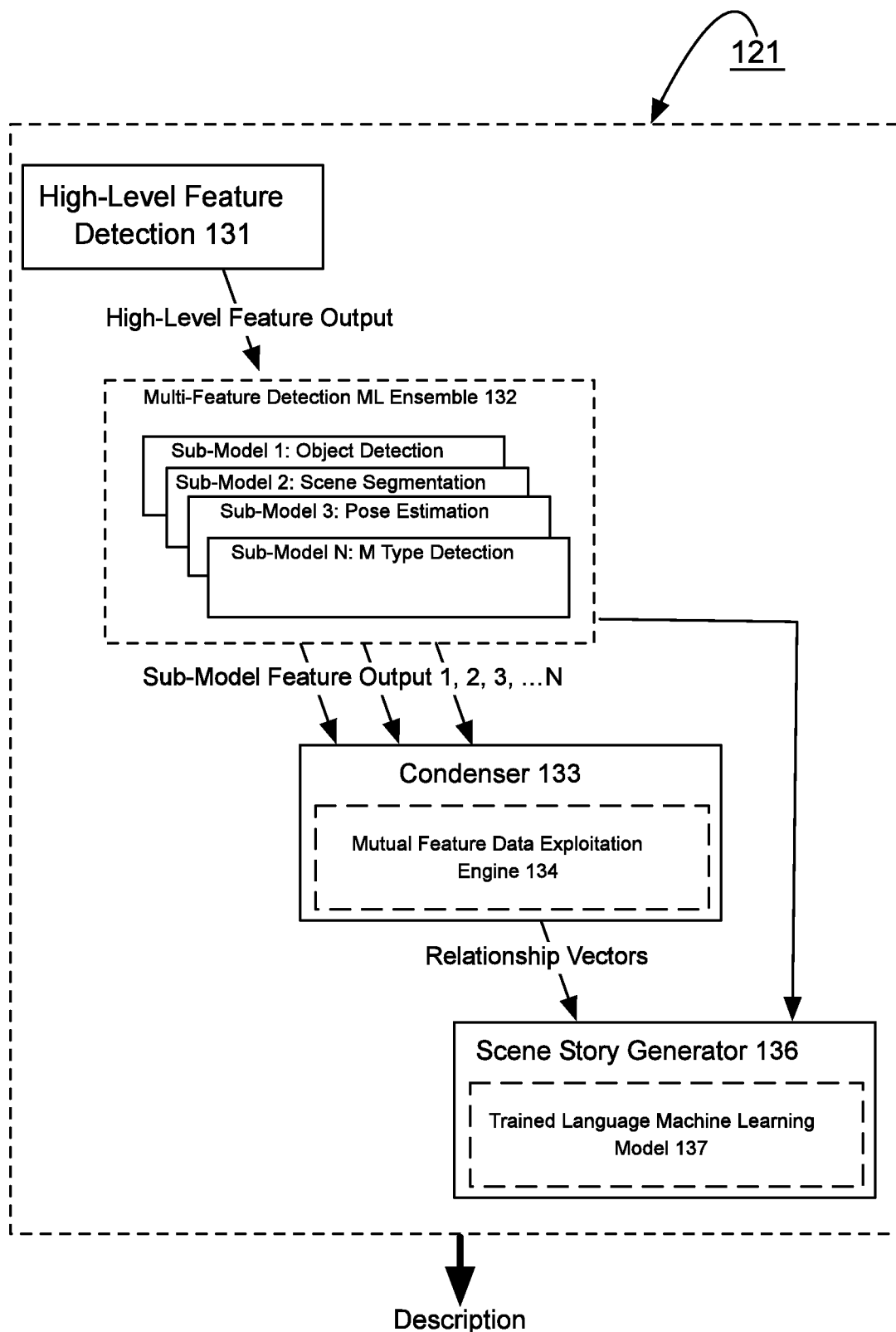
FIG. 3 illustrates a detailed schematic of a comprehension system in accordance with one or more embodiments of the present application.
Figure 4:
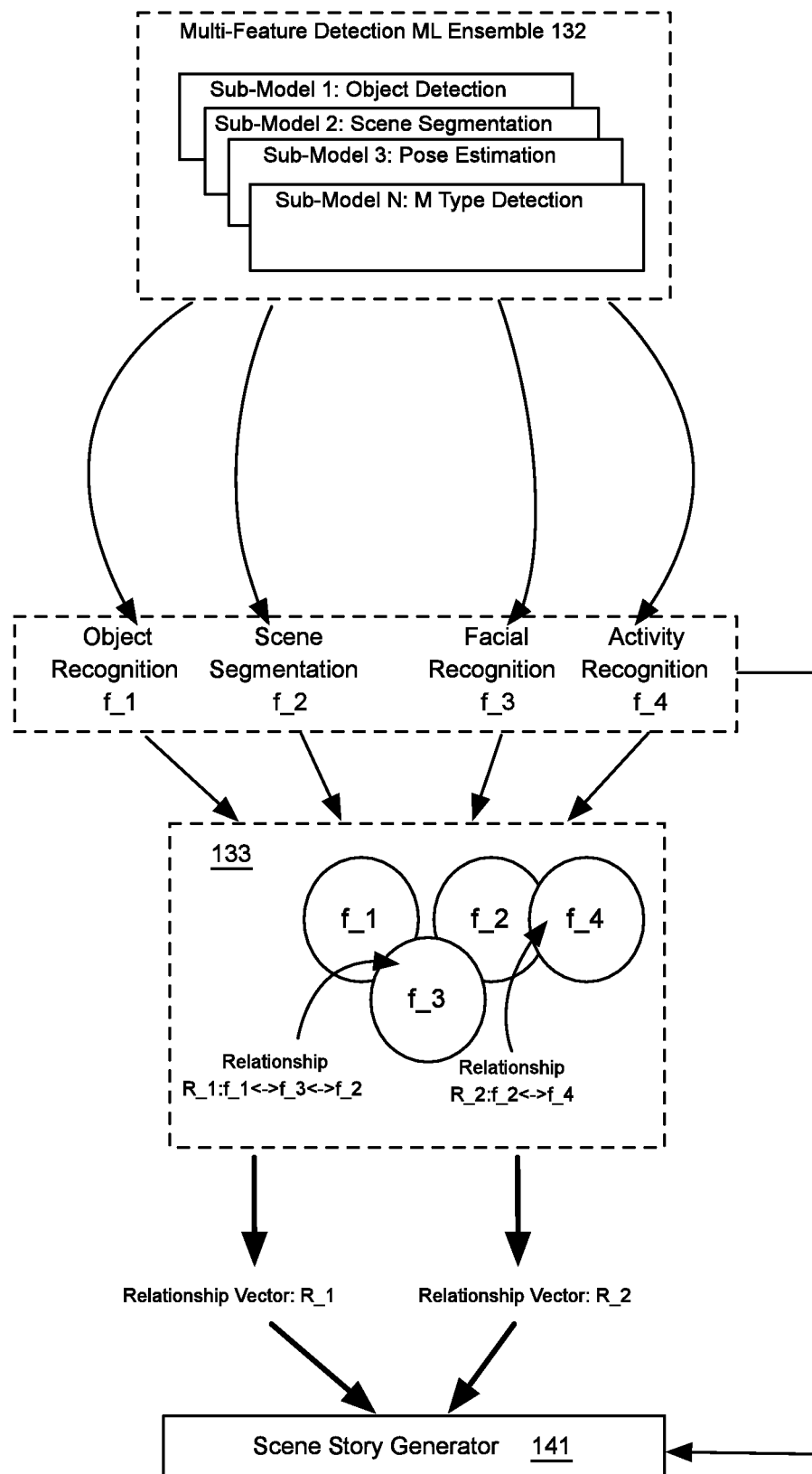
FIG. 4 illustrates a detailed schematic of components of the comprehension system in accordance with one or more embodiments of the present application.

As shown in FIG. 3, the semantic module 121 may include a high-level feature detection model 131, a multi-feature detection machine learning ensemble 132, a condenser 133 having a mutual feature data exploitation engine 134, and a scene story generator 136 having a trained language machine learning model 137.

In some embodiments, the semantic module 121 functions to collect image data (in any form) from the one or more image data sources 110 within the system 100. The semantic module 121 preferably functions to implement a combined machine learning model core (i.e., multi-feature detection machine learning ensemble 132) to detect relevant features within a scene defined by the collected image data. The semantic module 121 may use the condenser 133 to form a composite of a plurality of feature outputs (e.g., $f\_1, f\_2, f\_3 \ldots f\_n$) of the multiple sub-models of the combined model core. From the composite, the semantic module 121, using the mutual feature data exploitation engine 134, functions to extract mutual/relationship data from overlapping segments of the composite and derives mutual/relationship vectors, as output. The semantic module 121 may pass the plurality of feature data outputs and the mutual/relationship vectors to the story generator 136 that functions to use the trained machine learning model 137 to generate one or more descriptions (semantic information) (e.g., event description, scene description) for the image data.

The one or more image data sources 110 preferably function to capture image data of one or more areas of interest within a predetermined space. The area of interest may be a fixed area in which a field of vision of an image capturing system may be fixed. Additionally, or alternatively, the area of interest may be dynamic such that a field of vision of an image capturing system may change continuously or periodically to capture different areas of interest. The image data sources 110 preferably include an image capturing system comprising one or more image capturing devices. The image capturing devices may include video cameras, still image cameras, satellites, scanners, frame grabbers, and the like that may can capture analog video signals, digital video signals, analog still image signals, digital still image signals, and the like. Additionally, digital images may be captured or produced by other sensors (in addition to light-sensitive cameras) including, but not limited to, range sensors, tomography devices, radar, ultra-sonic cameras, and the like.

The one or more image data sources 110 may function to capture image data and transmit the image data via a network to the system 100 (e.g., by using a network switch). Additionally, or alternatively, the semantic module 121 may function to access the image data from at least one image data source 110.

The one or more image capturing devices 110 may configured to optimize scene coverage thereby minimizing blind spots and additionally, optimize overlapping coverage areas for potential areas of significant interest (e.g., a highly secure area, etc.). In some embodiments, the comprehension system 120 functions to process overlapping image data from multiple image data sources 110 (having overlapping fields of view) recording image data from a substantially same area of interest with the recording being performed at different positions of the image data sources 110. The image data in these areas of interest having overlapping coverage may enable the comprehension system 120 to generate increased quality event description data for a scene. In some embodiments, the comprehension system 120 uses the semantic module 121 to process image data from each image data source of a group having overlapping coverage separately to generate semantic information for each image data source, and combining semantic information generated by each such image data source to generate semantic information for the overlapping coverage area.

Additionally, or alternatively, the comprehension system 120 may function to access additional event data sources including sensor data sources, news feed data sources, communication data sources, and the like. The additional event data may be ingested by comprehension system 120 and used to augment the event description data for a scene. In some embodiments, the additional event data may is ingested by comprehension system 120 and used to generate contextual metadata (e.g., stored in the contextual metadata module 127).

The comprehension system 120 functions to analyze and/or process image data input preferably originating from the one or more image data sources 110. The semantic module 121 preferably includes a high-level deep learning model (e.g., a convolutional neural network, etc.) 131 that functions to perform edge and/or border detection. Accordingly, the high-level deep learning model may function to extract coarse semantic information from the image data input from the one or more image data sources 110. For instance, the high-level deep learning model implementing an artificial neural network may function to first extract broad scene level data and may generate descriptive metadata tags, such as outdoor, street, traffic, raining, and the like.

The multi-feature detection machine learning ensemble 132 may include a plurality of sub-machine learning models, each functioning to perform a distinct feature detection. Specifically, the plurality of sub-machine learning models may function to perform distinct computer vision tasks and feature detection tasks that include, but are not limited to, pose estimation, object detection, facial recognition, scene segmentation, object attribute detection, activity recognition, identification of an object (e.g., person ID, vehicle, ID, fingerprint ID, etc.), motion analysis (e.g., tracking, optical flow, etc.), and the like. Each of the sub-models, accordingly, may extract image level features (according to the computer vision task configuration of the sub-model) and convert the image level features as a vector in n-dimensional hyperspace (e.g., feature output data, as discussed further below).

Additionally, the comprehension system 120 may function to identify or classify any features of the accessed image data.

Figure 6:
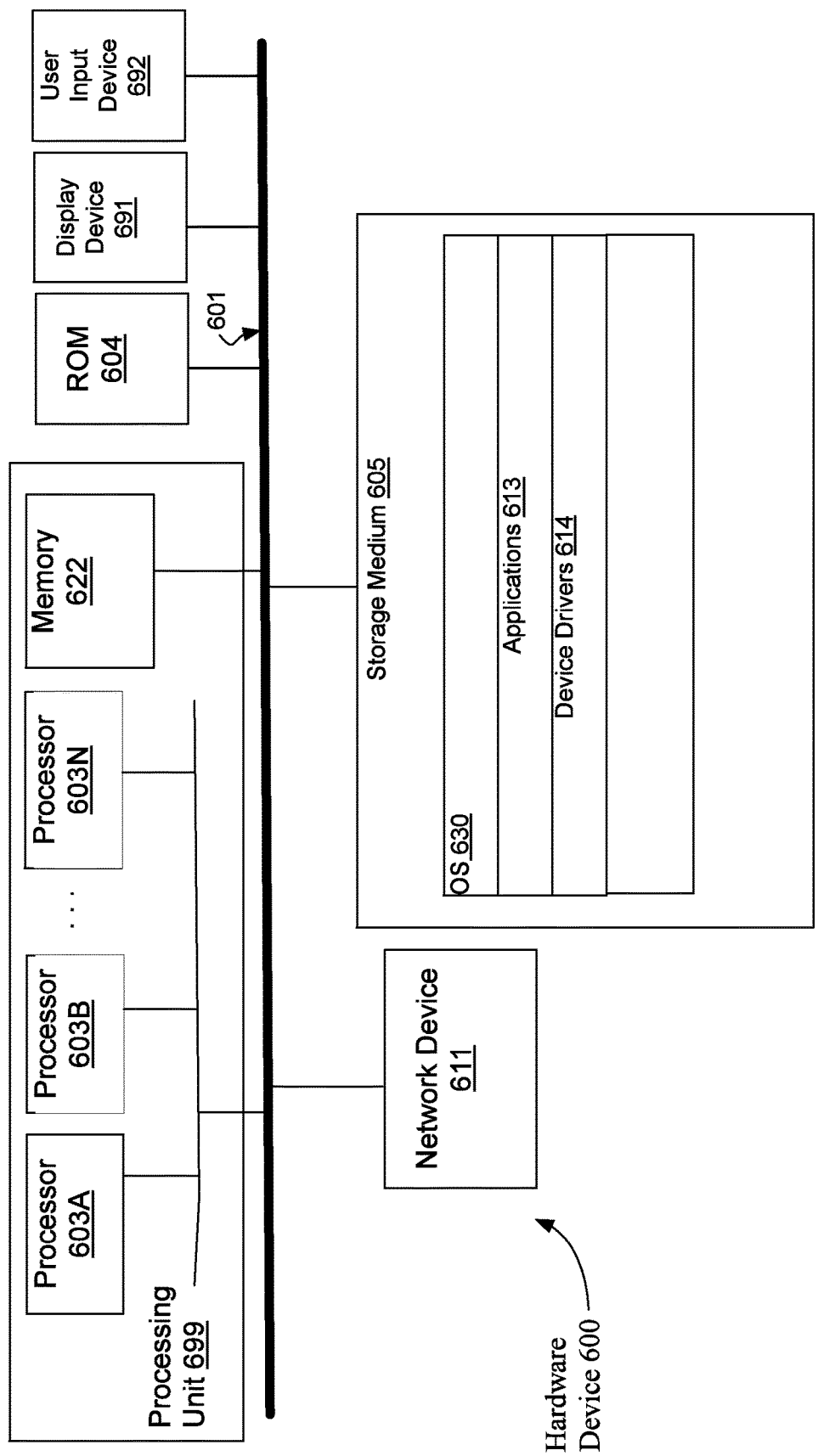
FIG. 6 illustrates a system architecture of a system in accordance with one or more embodiments of the present application.

In some embodiments, the comprehension system 120 is implemented by one or more computing servers having one or more computer processors (e.g., graphics processor units (GPU), tensor processing unit (TPU), central processing units (CPUs, MCUs, etc.), or a combination of web servers and private servers) that may function to implement one or more ensembles of machine learning models. In some embodiments, the comprehension system 120 is implemented by at least one hardware device 600, as shown in FIG. 6. In some embodiments, a storage medium (e.g., 605) of the comprehension system includes at least one of machine-executable instructions and corresponding data of the semantic module 121. In some embodiments, the machine-executable instructions of the semantic module 121 include machine-executable instructions for at least one of the high-level feature detection model 131, the multi-feature detection machine learning ensemble 132, the condenser 133, the data exploitation engine 134, the scene story generator 136, and the trained language machine learning model 137.

In some embodiments, the ensemble 132 of machine learning models includes multiple machine learning models that work together to exploit mutual information to provide accurate and useful feature detection and relationship vectors therefor. In some embodiments, the comprehension system 120 functions to communicate with at least one external system (e.g., 110, 130) via one or more wired or wireless communication networks (e.g., 101) by using a network device (e.g., 611). In some embodiments, the comprehension system 120 utilizes input from various other data sources (e.g., outputs of system 100, system 100 derived knowledge data, external entity-maintained data, etc.) to continuously improve or accurately tune weightings associated with features of the one or more of the machine learning models of the comprehension system 120.

In some embodiments, the semantic module (and optionally the event detection module) of the comprehension system 120 includes at least one machine learning system. In some embodiments, machine learning systems include one or more of a local machine learning system (e.g., implemented in Python, R, etc.), a cloud-based machine learning client (e.g., an application communicatively coupled to a cloud-based machine learning system such as, for example, Microsoft Azure Machine Learning Service™, and the like).

In some embodiments, at least one machine learning system included in the comprehension system 120 is constructed to perform one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each model of the ensemble 122 can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. At least one processing portion of the system 120 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 120. Further, any suitable model (e.g., machine learning, non-machine learning, etc.) can be used in generating scene comprehension data via system 120.

The user interface system 130 may function to receive outputs from the comprehension system 120 (e.g., via a bus, a network device, etc.) as well as from the one or more image data sources 110. In some embodiments, the user interface system 130 functions to present a user interface provided by the comprehension system 120. In some embodiments, the user interface system 130 functions to present image data from the one or more image data sources 110 together with a scene description or scene story of the image data. In some embodiments, the image data comprises video data and the scene description or scene story is superimposed over the video data via a display of the user interface system 130, such that the scene description is presented at a same time as a video basis of the scene description. In some embodiments, the scene description or scene story is presented in any suitable manner including visually, audibly, haptically, and the like.

In some embodiments, the user interface system 130 includes one or more computers having input/output systems including one or more of displays (e.g., video monitors), keyboards, mice, speakers, microphones, and the like. The user interface system 130 may additionally include a communication interface that enables the user interface system 130 to communicate over a communication network (e.g., the Internet) with the other components of system 100.

In some embodiments, the event detection module 124 functions to implement a machine learning model core that detects events based on at least one of contextual metadata data stored by the comprehension system 120 (e.g., in the contextual metadata module 127) and semantic information generated by the semantic module 121. In some embodiments, the event detection module 124 functions to implement a machine learning model core that detects events based on contextual metadata data stored by the comprehension system 120 (e.g., in the contextual metadata module 127) and generated by using the semantic module 121 to process image data provided by the plurality of image data sources 110. In some embodiments, the machine learning model core of the event detection module 124 is constructed to perform one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. In some embodiments, the event detection module 124 functions implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. In some embodiments, the module 124 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the module 124. Further, in some embodiments, any suitable model (e.g., machine learning, non-machine learning, etc.) can be used in detecting events.

Figure 2:
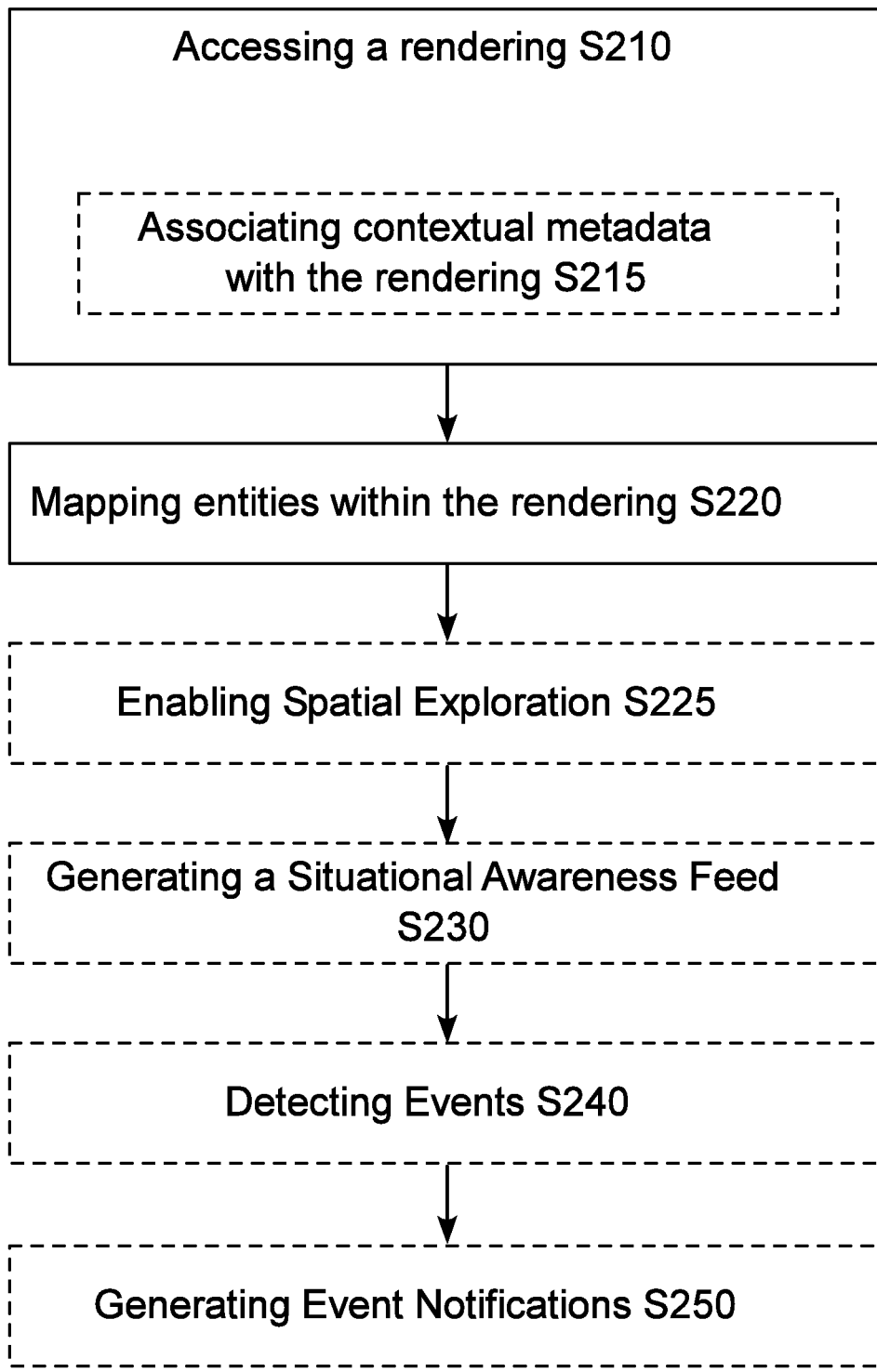
FIG. 2 illustrates a method for image data analysis and event detection in accordance with one or more embodiments of the present application.
Figure 7:
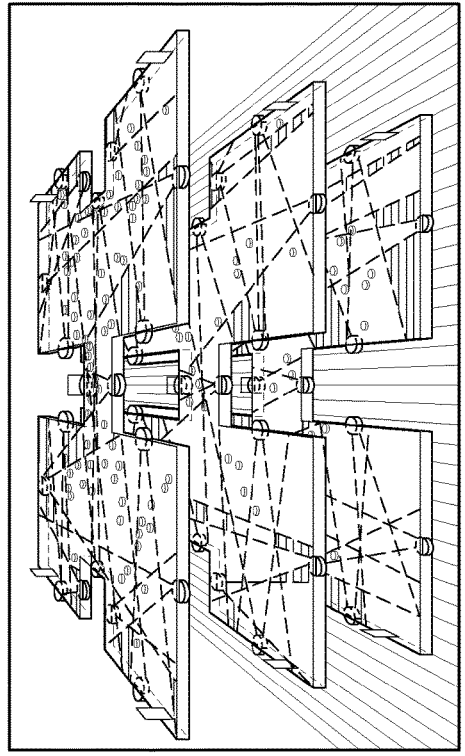
FIGS. 7 and 8 illustrates representations of spatial intelligence information in accordance with one or more embodiments of the present application.
Figure 7:
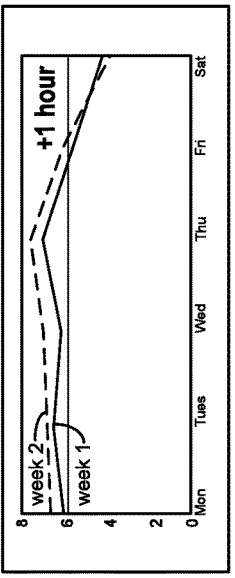
Figure 7:
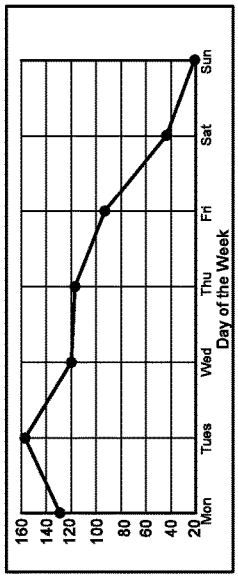
Figure 7:
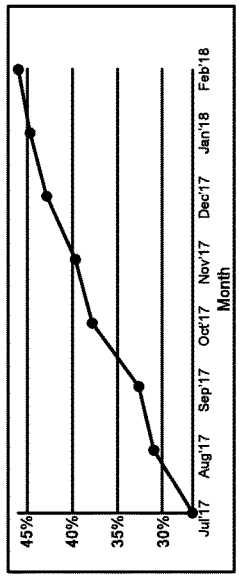
Figure 8:
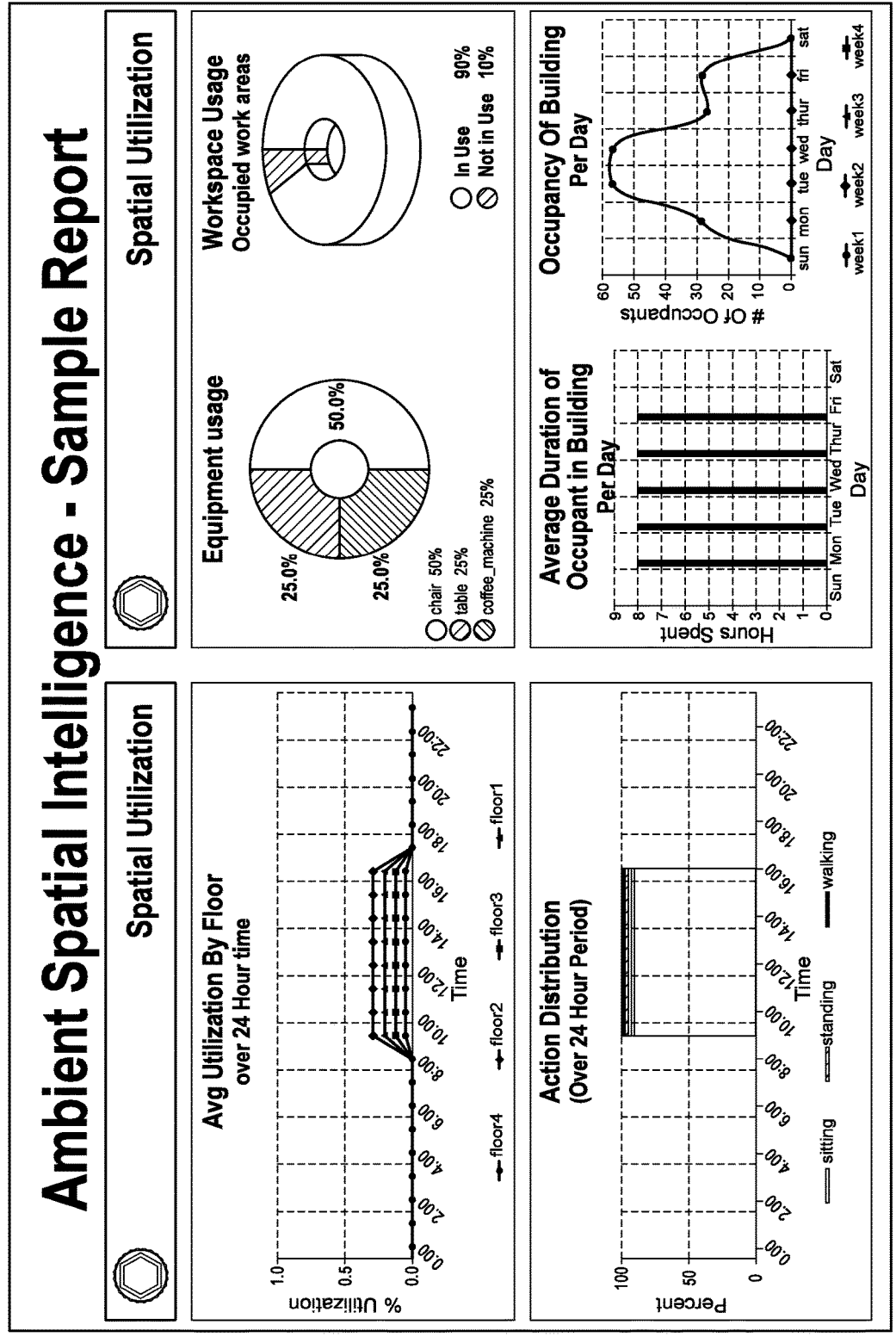

2. Method for Artificially Intelligent Image Data Analysis and Feature Detection A method 200 is shown in FIG. 2. In some embodiments, the method 200 includes at least one of accessing a rendering of a predefined space S210; and mapping entities within the rendering S220. In some embodiments, the method 200 includes at least one of: enabling spatial exploration S225, generating a live situational awareness feed S230, detecting an incident within the predefined space S240, and generating event notifications S250. In some embodiments, S210 includes: associating contextual metadata with the rendering S215. In some embodiments, S210 includes generating spatial intelligence data (e.g., contextual metadata). In some embodiments, S220 includes generating spatial intelligence data (e.g., contextual metadata). In some embodiments, the method includes generating contextual metadata, and generating spatial intelligence data from the contextual metadata. FIG. 7 shows user interfaces that display information generated from the spatial intelligence data generated by the method 200. FIG. 8 shows an exemplary user interface for a spatial intelligence report generated from the spatial intelligence data generated by the method 200.

In some embodiments, the predefined space includes a single building. In some embodiments, the predefined space includes a plurality of buildings (e.g., a campus). In some embodiments, the method 200 is performed by a comprehension system (e.g., 120).

The method 200, generally, enables real-time spatial intelligence of a defined environment. In some embodiments, the method 200 preferably functions to access a rendering of a predefined space, such as a building (or any enclosed or unenclosed area), that enables the identification and human comprehension of activities, objects, and/or persons operating or existing within the predefined space based on data obtained from a plurality of spatially intelligent sensors (e.g., image data sources 110). In some embodiments, for each of the plurality of spatially intelligent sensors (e.g., smart cameras, movement sensors, heat sensors, etc.) arranged within or around the predefined space (e.g., video cameras inside and outside of a building), the method 200 includes associating an identifier of the sensor with a location within a coordinate space of the rendering, together with location information (within the coordinate space of the rendering) that represents a sensing area (e.g., camera field-of-view) for the sensor. In this way, the rendering accessed by the method 200 represents a dimensional view of one or more sections of a predefined space or the like together with information identifying locations of the spatially intelligent sensors (that perform intelligence capture) within a coordinate space of the view and, in some instances, interpretive analysis for the one or more sections of the predefined space. In some embodiments, the view is a two-dimensional (2D) view. In some embodiments, the view is a three-dimensional (3D) view.

S210 can include: accessing rendering data (e.g., 122) from at least one of a storage device of the system 120 and an external storage device (via one of a bus and a network device). In some embodiments, S210 includes accessing a rendering file. In some embodiments, S210 includes accessing a rendering system (e.g., a computer-aided design (CAD) system) that provides the rendering data. In some embodiments, the rendering data is included in a rendering file generated by an architect of a building that is being sensed by the comprehension system 120. In some embodiments, the rendering data is generated by a computer-aided design (CAD) system (e.g., an Autodesk™ CAD system, etc.). In some embodiments, the rendering data is generated in response to operation of the CAD system by an operator (e.g., a building architect). In some embodiments, the rendering module 123 generates the rendering data. In some embodiments, the rendering module 123 is a computer-aided design (CAD) system (e.g., an Autodesk™ CAD system, etc.). In some embodiments, the rendering module 123 is local rendering module. In some embodiments, the rendering module is a client to a cloud-based rendering platform. For example, during architectural design of a building (or campus that includes several buildings), an architect generates a rendering file using a computer-aided design (CAD) system (e.g., an Autodesk™ CAD system, etc.), and an operator of the system 120 receives the rendering file and stores the rendering file at the comprehension system 120. In some embodiments, the comprehension system automatically retrieves the rendering file from an external system.

In some embodiments, comprehension system 120 generates a view (e.g., a 2D view, a 3D view) by processing the rendering data, and the comprehension system 120 provides the view to at least one user interface system 130 (e.g., as image data, as video data, data to be displayed by a process of the user interface system). In some embodiments, the comprehension system 120 generates the view by using the rendering module 123.

S215 functions to associate contextual metadata with the rendering. In some embodiments, the contextual metadata includes sensor information of at least one of the plurality of spatially intelligent sensors. In some embodiments, the contextual metadata includes context information of the predetermined space.

In some embodiments, the comprehension system 120 augments the rendering data with the contextual metadata. In some embodiments, augmenting the rendering data with the contextual metadata includes: the comprehension system 120 appending the contextual metadata to the rendering data. In some embodiments, the comprehension system 120 appends the contextual metadata to the rendering data as rendering metadata. In some embodiments, the comprehension system 120 appends the contextual metadata to the rendering data as rendering metadata by editing a rendering file that includes the rendering data. In some embodiments, the comprehension system 120 appends the contextual metadata to the rendering data as rendering metadata by using an application programming interface (API) of a computer-aided design (CAD) system associated with the rendering data 122.

In some embodiments, augmenting the rendering data with the contextual metadata includes: the comprehension system 120 generating a knowledge graph for the predefined space, and adding the contextual metadata to the knowledge graph in association with the rendering data. In some embodiments, the comprehension system 120 generates the knowledge graph by using the contextual metadata module 127. In some embodiments, the contextual metadata module 127 is a graph database (e.g., Neo4j™, etc.). In some embodiments, the comprehension system adds the contextual metadata to the knowledge graph (in association with the rendering data) by using at least one of an API and a query language interface of the graph database.

In some embodiments, associating contextual metadata with the rendering data includes: associating a data item of contextual metadata with a location within a coordinate space of a rendering represented by the rendering data 122. In some embodiments, each location is represented by at least one of a point, a 2D geometric area, and a 3D geometric volume within the coordinate space of the rendering. In some embodiments, associating a data item of contextual metadata with a location includes at least one of: storing the data item and the information identifying the location in a same data structure; storing the data item in a data structure that includes a link to a data structure that includes information identifying the location; storing the data item in a knowledge graph node that includes information identifying a relationship between the data item and information identifying the location.

Figure 5A:
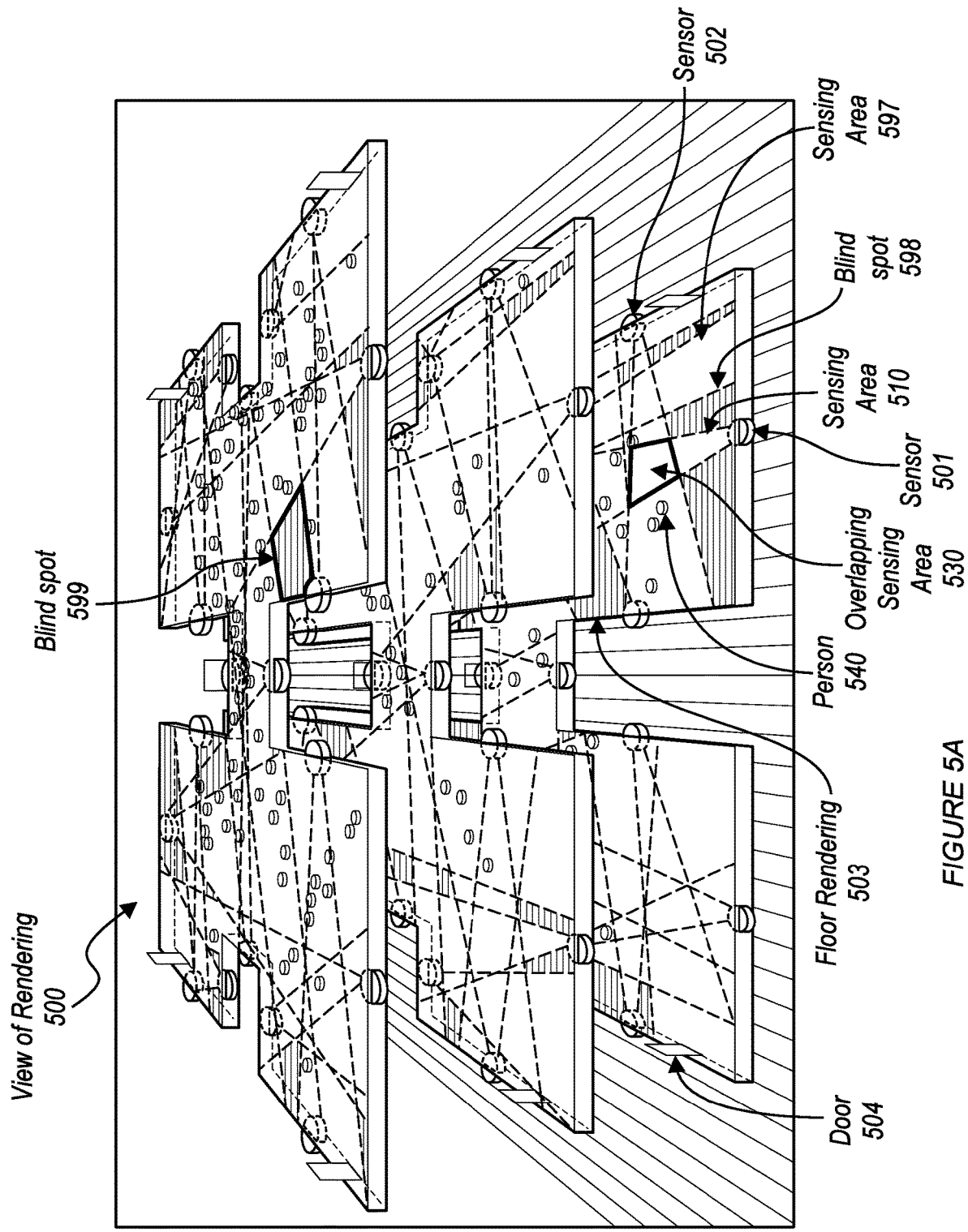
FIGS. 5A-D illustrate representations of an intelligent three-dimensional mapping of a predefined space with intelligent awareness within the predefined space in accordance with one or more embodiments of the present application.

In some embodiments, the contextual metadata includes sensor information for at least one sensor (e.g., spatially intelligent sensor, image data source 110, etc.). In some embodiments, the sensor information for a sensor includes an orientation of the sensor within a coordinate space of the rendering. In some embodiments, the sensor information for a sensor includes a sensor identifier. In some embodiments, the sensor information includes a description of the sensor. In some embodiments, the sensor information includes a description of a sensing area (e.g., camera field-of-view) for the sensor. In some embodiments, the sensing area of a sensor is described as a 2D geometric area within the coordinate space of the rendering. In some embodiments, the sensing area of a sensor is described as a 3D geometric volume within the coordinate space of the rendering. FIG. 5A shows a visual representation of a sensing area 510 for a sensor represented by visual element 501 in the rendering 500.

In some embodiments, the contextual metadata includes context information of the predetermined space. In some embodiments, context information of the predefined space includes at least one data item for at least one location within the coordinate space of the rendering. In some embodiments, a location within the rendering is represented by at least one of a point, a 2D geometric area, and a 3D geometric volume within the coordinate space of the rendering. In some embodiments, a context information data item for a location is a description of an area. In some embodiments, the area is one of a campus, an area surrounding a building (e.g., main entrance, side entrance, back entrance, garage, garden, road, driveway, loading area, parking lot, and the like), a building within a campus (e.g., main office building, warehouse, parking structure, overflow office building, datacenter building, and the like), a room within a building (e.g., kitchen, office, bathroom, mailroom, server room, conference room, and the like), an area within a room (e.g., a secure area, a public area, a private area, a top secret area, a dangerous area, a safe area, a construction area, a wet area, a dry area, a clean area, a quiet area, a talking area, a smoking area, a non-smoking area, a meditation area, engineer personnel work area, security personnel work area, finance personnel work area, and the like). In some embodiments, a context information data item for a location is a description of an object located at the location (e.g., a door, a window, a stairwell, a bathroom fixture, sprinkler system, a sensor, a safety system, an alarm system, an electronic access system, power backup system, power generation system, solar system, boiler, water heater, water filtration system, an HVAC system, a vent, a hatch, a drain, a lighting system, a skylight, a ladder, a power panel, a gas shut-off, a water shut-off, a utility box, an electrical outlet, an appliance, a desk, a table, a phone booth, an espresso machine, a refrigerator, an oven, a stove, a freezer, projector, a stage, a fixed display monitor, an electronic display wall, a teleconferencing system, a fan, a radiator, as printer/fax/copier, and the like).

S215 can include: an administrator interface (e.g., 125) receiving a data item of contextual metadata and user-selection of a location within the coordinate space of the rendering (represented by the rendering data 122). In some embodiments, the administrator interface stores the received data item of contextual metadata in a rendering module (e.g., 123) in association with the received location. In some embodiments, the administrator interface updates the rendering data 122 to include the received data item of contextual metadata with a reference to the received location. In some embodiments, the administrator interface generates a new knowledge graph node (for a knowledge graph of the predefined space) by using a knowledge graph module (e.g., 127), and adds the received data item of contextual metadata to the new knowledge graph node with information identifying a relationship between the new knowledge graph node and a knowledge graph node that represents the received location.

In some embodiments, the comprehension system 120 provides an administrator user interface (e.g., by using admin interface 125) to a user interface system 130, and the administrator user interface displays a view (e.g., a 2D view, a 3D view) generated by processing the rendering data, and the administrator user interface includes at least one user-input element that is constructed to receive user selection of a location within the displayed view and contextual metadata to be associated with the selected location.

In some embodiments, the comprehension system 120 provides an administrator user interface (e.g., by using admin interface 125) to a user interface system 130, and the administrator user interface at least one user-input element that is constructed to receive user selection of a file that contains contextual metadata. In some embodiments, the file that contains at least one data item of contextual metadata and corresponding information identifying a real-world location with real-world coordinates within a coordinate space of the predefined space.

In some embodiments, the rendering data 122 includes metadata mapping coordinates within the coordinate space of the rendering with real-world coordinates within the coordinate space of the predefined space. In some embodiments, the comprehension system 120 includes metadata mapping coordinates within the coordinate space of the rendering with real-world coordinates within the coordinate space of the predefined space.

In some embodiments, the comprehension system 120 is constructed to receive at least one data item of contextual metadata and corresponding information identifying a real-world location within a coordinate space of the predefined space, determine a location within the rendering that corresponds to the real-world location, and associate the data item with the location within the rendering, as described herein.

In some embodiments, a data item of contextual metadata includes a sensor identifier and information identifying a sensing area (e.g., camera field-of-view) for a sensor (e.g., one of the image data sources 110). In some embodiments, the information identifying the sensing area identifies a sensing direction of the associated sensor. In some embodiments, the sensing area of a sensor is described as a 2D geometric area within the coordinate space of the predefined space. In some embodiments, the sensing area (e.g., FOV) of the sensor is described as a 3D geometric volume within a coordinate space of the predefined space. In some embodiments, the comprehension system 120 determines a sensing area within the rendering coordinate space of the rendering that corresponds to the sensing area identified by coordinates in the real-world coordinate space of the predefined space, and associates the sensor identifier with the sensing area (as identified within the rendering coordinate), as described herein.

In some embodiments, the sensing area (e.g., FOV) of a sensor is described as a 2D geometric area relative to a location of the sensor. In some embodiments, the sensing area of the sensor is described as a 3D geometric volume relative to a location of the sensor. In some embodiments, the comprehension system 120 determines a rendering area within the rendering coordinate space of the rendering that corresponds to the sensing area, and associates the sensor identifier and the rendering area with information identifying a location within a coordinate space of the rendering, as described herein.

S215 can include: the comprehension system 120 automatically generating the contextual metadata. In some embodiments, contextual metadata includes at least one description (e.g., event description, scene description) generated by the semantic module 121 for data received from a sensor (e.g., image data received form an image data source 110), as described herein. In some embodiments, contextual metadata includes at least one description (e.g., event description, scene description) generated by the semantic module 121 for data received from each sensor of the system 100 (e.g., image data received form an image data source 110), as described herein. In some embodiments, the system includes hundreds of sensors. In some embodiments, the system includes thousands of sensors. In some embodiments, the system includes hundreds of thousands of sensors.

In some embodiments, the semantic module 121 stores identifiers for sensors (e.g., 110) of the system 100 in association with information identifying a location within the rendering coordinate space of the rendering, receives data from a sensor in association with an identifier for the sensor, accesses the location (within the rendering) associated with the identifier, generates at least one description (e.g., event description, scene description) for the sensor data (as described herein); the comprehension system 120 associates the generated at least one description with the accessed location (within the rendering), as described herein.

In some embodiments, the semantic module 121 generates at least one description (e.g., event description, scene description) for the received sensor data by using contextual metadata associated with the rendering. In some embodiments, the semantic module 121 access the contextual metadata (and updates the contextual metadata) by using the contextual metadata module 127. In some embodiments, the semantic module 121 access the contextual metadata (and updates the contextual metadata) by using the rendering module 123. In some embodiments, the semantic module 121 access the contextual metadata (and updates the contextual metadata) by reading from (and writing to) the rendering data 122.

In some embodiments, the high-level feature detection module 131 generates at least one feature for the received sensor data by using contextual metadata associated with the rendering. In some embodiments, at least one model of the ensemble 132 generates at least one feature for the received sensor data by using contextual metadata associated with the rendering. In some embodiments, the condenser 133 generates at least one relationship vector for the received sensor data by using contextual metadata associated with the rendering. In some embodiments, the story generator 136 generates at least one description for the received sensor data by using contextual metadata associated with the rendering.

In some embodiments, the semantic module 121 generates a description for received sensor data by using contextual metadata (associated with the rendering) that describes at least one of: an area surrounding a building, a building, a room, an area within a room, and an object. In some embodiments, the semantic module 121 generates a description for received sensor data (e.g., from a first sensor) by using contextual metadata generated by the semantic module 121 for sensor data received from at least one other sensor (e.g., a second sensor). In some embodiments, the semantic module 121 generates a description for received sensor data (from a first type of sensor, e.g., an image sensor) by using contextual metadata generated by the semantic module 121 for sensor data received from at least one other different type of sensor (a second sensor, e.g., a movement sensor, heat sensor, etc.).

In some embodiments, the comprehension system 120 provides a user interface (e.g., by using admin interface 125, by using the operator interface 126) to a user interface system 130, and the user interface displays a view (e.g., a 2D view, a 3D view) generated by processing the rendering data augmented with the contextual metadata. In some embodiments, the view includes at least one visual representation of the contextual metadata superimposed onto a visual representation of the rendering data.

S225, can include: the comprehension system 120 receiving user-selection of a user-interface element for selecting a viewing perspective, and updating the view displayed by the user interface in accordance with the selected viewing perspective. In some embodiments, user-interface element for selecting the viewing perspective is a visual representation of a sensor (e.g., 110), and responsive to receiving user-selection of the visual representation of the sensor, the comprehension system 120 accesses information identifying a viewing perspective associated with the sensor, and updates the view displayed by the user interface in accordance with the accessed viewing perspective for the selected sensor. In some embodiments, accessing information identifying a viewing perspective associated with the sensor includes: accessing information identifying a sensing area of the sensor (which includes both a geometric area and a sensing direction), and determining the viewing perspective based on at least one of the identified geometric area and sensing direction. In some embodiments, the comprehension system updates the view displayed by the user interface by using the rendering module 123.

The spatial intelligence (e.g., the contextual metadata associated with locations within the coordinate space of the rendering) data generated by the method 200 preferably includes insights and data relating to any or all perceivable objects, activities (e.g., situations, circumstances, etc.), persons, and the like. In one or more embodiments, the method 200 produces the spatial intelligence data (contextual metadata, semantic information etc., associated with locations within a rendering) by extracting semantic information from the spatially intelligent sensors. The method 200 may function to intelligently map within the spatial rendering (e.g., by associating with a location within a coordinate space of the rendering) any object, person, or activity identified within the semantic information. The augmentation of the real-time semantic information (e.g., contextual metadata, semantic information) to the spatial rendering of the predefined space (e.g., by associating the data with rendering coordinates, for example, by using a knowledge graph managed by a graph database) enables a live presentation (e.g., included in a user interface, e.g., 125, 126) via the spatial rendering that may function to provide real-time insights surrounding any circumstance or object within the predefined space.

Accordingly, with the implementation of the method 200 a number of benefits may be achieved including, but not limited to: (i) a heightened level of situational awareness of circumstances, activities, and occurrences in a predefined space (e.g., emergencies, security threats, etc.), (ii) a comprehension of the circumstances, activities, and occurrences in the predefined space and a quantification of these activities and the like to generate additional insights relating to building occupancy, coarse and fine-grained space utilization, occupant comfort, spatial preferences, time-spent in one or more sections or zones of the predefined space, and the like.

FIG. 7 shows user interfaces that displays a visual representation of a rendering for a building, and corresponding information generated from the spatial intelligence data generated by the method 200. As shown in FIG. 7, the user interface includes visual representations of space utilization information, employee productivity information, building occupancy information, spatial preferences (e.g., preference for one or more of the Atrium, Private Workspace, Cafeteria, Lounge, Recreational Spaces, FrontDesk, Touchdown Space).

FIG. 8 shows an exemplary user interface for a spatial intelligence report generated from the spatial intelligence data generated by the method 200. As shown in FIG. 8, the user interface identifies average utilization by floor for a building, action distribution (e.g., sitting, standing walking), equipment usage within the building (e.g., of chairs, tables, coffee machines, etc.), workspace usage, average duration of occupants in the building, and occupancy of the building.

Additionally, while the spatial intelligence data generated by the method 200 may generally be used to generate spatial rendering (e.g., by using the rendering module 123) that provides situational awareness and comprehension, the spatial intelligence data may be used in other applications for interacting with and/or controlling other endpoint devices in the predefined space. In some embodiments, the comprehension system provides external systems access to spatial intelligence data stored by the comprehension system (e.g., stored by the contextual metadata module 127, the rendering module 123, the fendering data 122, etc.). For instance, the spatial intelligence data may be correlated with endpoints including occupancy sensors, lighting devices, access control systems, heating ventilation air conditioning (HVAC) systems to provide a unified perspective of one or more operations of the predefined space and identify optimization opportunities resulting therefrom. For instance, the spatial intelligence data may be used to determine live occupancy of a building to control HVAC settings to reduce energy expenditures. In yet another example, the spatial intelligence data may be used to measure an increase or decrease in utilization of a space after the space has been reconstructed (remodeled) to collect implicit feedback regarding the changes to the space.

Reverting to S210, in some embodiments, S210, functions to configure a three-dimensional rendering of a predefined area or space. The predefined area may include any area that may be an opened area or a closed area (or some combination of a closed and opened areas) that may be under surveillance of one or more image data capturing devices or sensors (e.g., such as video cameras). While S210 preferably functions to configure a three-dimensional rendering of a predefined area, S210 may also function to generate any type of representation of a real view of the predefined area that may be captured by an image capturing device including configuring or rendering a two-dimensional map of a predefined space.

In some embodiments, S210 functions to collect a predetermined schematic (e.g., access from a storage device, receive via a user interface, receive via a network interface, receive from an external system via a network, etc.) of a predefined space and function to convert the predetermined schematic of the predefined space into rendering input (e.g., the rendering data 122) for generating a three-dimensional rendering of the predefined space (e.g., by using the rending module 123). For instance, the predetermined schematics may be schematics that describe and/or detail all features of a building (internal and external features or areas), a campus, an outdoor area, and the like. In the case that the predetermined schematics is of a multi-level building, S210 may function to convert each level of the building illustrated in the schematic into rendering data for distinct level (e.g., floor rendering 503 shown in FIG. 5A) in which all levels of the building may be illustrated in a signal three-dimensional rendering represented by the rendering data.

In some embodiments, the predetermined schematics may include critical locations within the predefined area (e.g., exits, offices, vaults, etc.) and identify by name or title each of the critical locations. In some embodiments, the comprehension system stores the information identifying critical locations (extracted from the schematics) as contextual information, as described herein. S210 may additionally convert the critical locations data (contextual metadata) along with any other suitable data describing relevant locations within the predefined area to rendering data input for generating a three-dimensional rendering of the predefined space. As shown in FIG. 5A, the rendering 500 includes visual representations of each door (e.g., 504), and includes a visual representation for each floor (level) (e.g., 503) of the predetermined space.

S220 functions to determine locations of detected entities within the coordinate space of the rendering (e.g., 500 shown in FIG. 5A). In some embodiments, the comprehension system 120 uses least one sensor (e.g., image data source 110) of the system 100 to detect entities within the predetermined space. In some embodiments, S220 includes: the comprehension system 120 detecting at least one entity by using at least one sensor (e.g., 501, 502) of the system 100, determining a location of the entity within the coordinate space of the rendering, and updating the rendering (e.g., 500) to include a visual representation (e.g., 540 shown in FIG. 5A, 541-544 shown in FIG. 5C) of the detected entity. In some embodiments, the comprehension system 120 continuously tracks location and movement of each detected entity (in real-time) and continuously updates the rendering (e.g., updates the location of the representation 540 within the rendering 500, shown in FIG. 5A) in response to movement of the tracked entity. In this manner, a view of the rendering provides locations and movements of each entity detected by the comprehension system 120. In some embodiments, the comprehension system 120 uses the semantic module 121 to detect entities. In some embodiments, the comprehension system 120 updates the rendering by updating the rendering data 122 to include information identifying the location of the detected entity (and optionally a description of the detected entity). In some embodiments, the comprehension system 120 updates the rendering by controlling the rendering module 123 (e.g., via an API of the rendering module 123) to update the rendering to include information identifying the location of the detected entity (and optionally a description of the detected entity). In some embodiments, S220 includes: the comprehension system 120 updating the contextual metadata stored by the comprehension system 120 to include information identifying the location of the detected entity (and optionally a description of the detected entity) as contextual metadata. In some embodiments, the comprehension system 120 updates the contextual metadata by using the contextual metadata module 127 (e.g., by using an API of the contextual metadata model 127).

In some embodiments, S220 includes the comprehension system 120 collecting position data of one or more image capturing devices (e.g., spatially intelligent sensors) that may be located within or immediately proximate to the predefined area (e.g., positions of sensors represented by 501, 502 of FIG. 5A). Accordingly, the position data of the one or more image capturing devices may include positions of all or most of the image capturing devices located within a predefined space such as a building. Additionally, the position data of the one or more image capturing devices may include positions of all or most of the image capturing devices external to an area defined by a building or the like. Thus, this position data may include image capturing devices positioned on an outside of a building or on a surface thereof. Additionally, this position data may include image capturing devices positioned in an immediate vicinity of the building (e.g., within 0-30 feet of the outside surface of the building and the like). The position data of the image capturing devices preferably includes a spatial location of each image capturing device including coordinates (e.g., X, Y, and Z-coordinates) for each image capturing device within the predefined area (e.g., within the building). In some embodiments, the coordinates are coordinates within a real-world coordinate space of the predefined area. In some embodiments, the coordinates are coordinates within a coordinate space of the rendering.

It shall be noted that while S220 is generally configured to identify position data for image capturing devices, as described above, S220 may function to identify position data for any suitable sensor (or spatially intelligent sensor) (e.g., positions of sensors 501, 502 of FIG. 5A) and augment the position data of the sensor to a rendering of the predefined area or space (e.g., by displaying visual representations 501, 502 in rendering 500 as shown in FIG. 5A).

In some embodiments, S220 functions to use the position data of the image capturing devices to map each of the image capturing devices to a location within a coordinate system of the rendering (e.g., 500) of the predefined area. In some embodiments, S220 includes converting the rendering data of the predefined area augmented with the position data of the image capturing devices into rendering input (e.g., by using the rendering module 123) for generating a three-dimensional rendering (e.g., 500) (e.g., by using the rendering module 123) of the predefined area having representations of the image capturing devices (e.g., representation 501, 502) and corresponding representations of their respective fields-of-view (e.g., 510) (e.g., sensing ranges or sensing areas) represented therein (e.g., as shown in FIG. 5A). As shown in FIG. 5A, the rendering view 500 is augmented to include visual representations of sensors 501 and 502 within the coordinate space of the rendering 500. As shown in FIG. 5A, the rendering 500 includes visual representations of sensing areas of each sensor (e.g., sensing area 510). By virtue of depicting visual representations of sensing areas for each sensor, overlapping sensing areas can be identified (e.g., overlapping sensing area 530). As shown in FIG. 5A, the sensing areas of sensors 501 and 502 overlap within sensing area 530. In other words, an entity (e.g., person 540) located within the sensing area 530 is sensed by both the sensors 501 and 502. In the case of sensors 501 and 502 being cameras, an image of an entity located within the sensing area 530 is included in image data captured by each of the cameras 501 and 502. In some embodiments, the semantic module uses semantic information generated from image data from each of cameras 501 and 502 to generate a description for an entity located in the overlapping sensing area 530.

Additionally, the image capturing devices (e.g., 110) may be any type or kind of suitable image capturing devices or sensors. The image capturing devices may be static (e.g., field-of-view) and/or dynamic with a varying field-of-view and capabilities to pan, tilt, or zoom within a scene. Preferably, the image capturing devices include depth sensors that enables the image capturing devices to capture distance data of objects or of entities within a scene or within its field-of-view.

Reverting to S215, in some embodiments, S215 includes identifying blind spots within a predefined area based on the determined FOVs (sensing areas, e.g., 510 shown in FIG. 5A) of each of the image capturing devices within a predefined area. In some embodiments, S215 includes generating blind spot data that identifies locations of blind spots within the coordinate space of the rendering (by using the contextual metadata identifying sensing areas of sensors, e.g., camera FOVs), and storing the blind spot data as additional contextual metadata (e.g., by using the contextual metadata module 127). In some embodiments, S215 includes updating the rendering (as described herein) to include a visual representation of each blind spot represented by the blind spot data.

In some embodiments, S220, includes collecting position data of physical entities, activities, and objects within the predefined space using the image capturing devices and mapping the physical entities within the predefined space. That is, in some embodiments, S220 includes extracting semantic data from the sensor data generated by the one or more image capturing devices within the predefined space (by using the semantic module 121), wherein the semantic data identifies entities, activities, and objects within the predefined space, and using the semantic data to generate contextual metadata that associates a description of each identified entity and activity within a location within the coordinate space of the rendering. In some embodiments, S220 includes determining a location for each identified entity and activity identified by the image data of the image capturing devices within the coordinate space of the rendering.

In some embodiments, the location and/or FOV (sensing area) information stored at the comprehension system 120 for an image data source is used to determine a location of each entity, activity, and object identified from the image data of the image data source. In some embodiments, the system 120 infers that any entity, activity, and object identified from the image data of the image data source is located within the FOV (e.g., 510 shown in FIG. 5A) of the image data source; the comprehension system accesses the location of the FOV (sensing area) within the rendering (which is stored by the comprehension system 120 in association with an identifier of the image data source), and associates the location of the FOV within the rendering with a location of each entity, activity, and object identified from the image data of the image data source. In this manner, the general location of each detected entity, activity, and object can be inferred. For example, if a person is detected from the image data of the sensor 501, then the comprehension system 120 can infer that the person is located within the sensing area 510, as shown in FIG. 5A. In some embodiments, an image data source includes a depth sensor that identifies a distance of at least one entity, activity, and object sensed by the image data source from a point of origin of the image data source, and the sensing area information associated with the image data source identifies a sensing direction; the comprehension system 120 uses the distance and direction information to identify a location of the at least one entity, activity within the FOV of the image data source. In some embodiments, the comprehension system 120 identifies overlapping FOVs among the plurality of image data sources, and compares image data of each image data source (associated with the overlapping FOVs) to identify each entity, activity, and object in image data of the image data sources that corresponds to the overlapping FOVs; the system 120 infers that any entity, activity, and object identified in image data of each of the image data sources of the overlapping FOVs is included in an area represented by the overlapping FOVs in the coordinate space of the rendering. For example, if a person is detected from the image data of the sensor 501 and the image data of sensor 502, then the comprehension system 120 can infer that the person is located within the overlapping sensing area 530, as shown in FIG. 5A.

In some embodiments, S220 functions to use the semantic data extracted from the sensor data together with FOV data for each of the image capturing devices within the predefined area to determine three dimensional locations of any identified object or physical entity within the coordinate space of the rendering.

In one implementation, distances and/or positions along a FOV for each image capturing device may be known or predetermined. In some embodiments, for at least one image data source, the comprehension system 120 includes FOV mapping data that identifies a mapping of locations within a coordinate space of image data of the image data source (e.g., 110) to locations within the FOV of the image data source (as identified by coordinates within the coordinate space of the rendering); the comprehension system 120 determines a location of a detected element (entity, activity, object) within the coordinate space of the rendering by identifying a location of the element within the coordinate space of the image data, and using the FOV mapping data of the image data source to map the image data location to a location within the rendering coordinate space.

In a second implementation, using position data of an image capturing device and known position data of fixed or relatively fixed objects within a predefined area, S220 may function to interpolate position data of an object or physical entity within the predefined area. For instance, if the position (e.g., X-Y or X-Y-Z position) of an image capturing device is known and a position of a fixed object, such as a wall or window, within the predefined area is known, S220 may function to interpolate position data of a detected object or physical entity that lies between the position of the image capturing device and the fixed object.

In a third implementation, a coordinate mapping of a predefined area (from the perspective of the image capturing devices or sensors) may be generated that provides fine-grained coordinate or position data for positions within the predefined area. Accordingly, S220 may function to map sensor data (e.g., an image frame) obtained from an image capturing device operating with the predefined space to the coordinate mapping of the predefined area to determine position data of an object or physical entity identified with the sensor data (e.g., the image frame). In some embodiments, a coordinate mapping of a sensor (e.g., image data source) maps a coordinate within the coordinate space of the image data of the sensor to a coordinate space within the coordinate space of the rendering. In some embodiments, S220 includes generating a coordinate mapping for at least one image data source. In some embodiments, generating a coordinate mapping for an image data source includes, generating a first coordinate mapping that maps coordinates within the image coordinate space to the real-world coordinates; generating a second coordinate mapping that maps real-world coordinates to rendering coordinates in the coordinate space of the rendering; generating the coordinate mapping that maps coordinates of the image data to coordinates of the rendering by using the first coordinate mapping and the second coordinate mapping.

Additionally, provided that three-dimensional position data of an image sensor (and its FOV) are known within the coordinate system of the rendering, and local position data of activities (events) and objects (including physical entities) detected in the image sensor data (e.g., a video feed) of the particular image sensor can be estimated using machine learning techniques by exploiting depth cues, a real-time (i.e., live) three-dimensional rendering of the space can be generated that illustrates a global position of the detected activities and objects in the physical space. Accordingly, the rendering generated by the method 200 may be completely dynamic in nature and may allow real-time tracking of global positions as objects/events move through the space in time.

It shall be noted that the method 200 may function to implement any suitable scheme or known method for determining position data of objects or physical entities from sensor data.

The physical entities within the space preferably include active physical entities that may be moving or operating within the predefined space and within a FOV of at least one of the image capturing devices. For instance, physical entities may include employees working within the predefined area, security personnel, guests, animals, machine-operated objects capable of moving within the predefined area, and/or any moveable person, thing, and/or object within the predefined area.

The objects identified within the predefined area may include any object that is relatively fixed within one or more sub-areas within the predefined space. Thus, the objects may include any inanimate or animate object that generally remains fixed in position within the predefined area relative to all active entities or objects.

Additionally, or alternatively, S220 may function to analyze the semantic data comprising the physical entity data and object data captured by the image capturing devices as input into the semantic module 121 to differentiate between the type of physical entities and types of objects within the predefined area. For instance, using the semantic module 121, S220 may function to identify the security personnel and employees among a plurality of physical entities detected within a scene. S220 may use the detected distinction in the physical entities with a scene to differentiate the physical entities within a rendering of the predefined area. For instance, S220 may code detected security personnel as blue representations (e.g., 543 shown in FIG. 5C) within a rendering and employees as green representations within a rendering. In the case of a security threat or emergency, a detected malicious actor may be represented as a red element (e.g., 544 shown in Fig. C) and a detected injured person as a purple element (e.g., 542 shown in Fig. C).

In some embodiments, the method 200 functions to use the collected inputs and/or derived inputs as well as image data (e.g., video image data) captured by the image capturing devices to render a three-dimensional rendering of a predefined space (e.g., by using the rendering module 123). As described above, the collected inputs and/or derived inputs may include any combination of the inputs described herein that may be combined with video image input captured by the image capturing devices to generate the three-dimensional rendering (e.g., 500) which includes one or more live situational awareness views.

The one or more live situational awareness views may generally include a real-time (or near real-time) representation of activities within one or more regions illustrated within the three-dimensional rendering. The one or more live situational awareness views may include real-time indicators (e.g., 561, 562 shown in FIG. 5B) identifying varying situations or events that may be detected and occurring within the respective views, which is discussed in more detail in S230.

The three-dimensional rendering (e.g., generated in S220, S225) may be configured to enable spatial exploration of scenes and FOVs of any of the image capturing devices operating within the predefined area. Specifically, the method 200 may enable user interaction of one or more regions of the three-dimensional rendering. In some embodiments, S225 enables a selection (e.g., via operator interface 126) of one or more regions (e.g., 530 shown in FIG. 5A) of a given three-dimensional rendering that focuses or makes large the selected region relative to an unselected region. S225 may function to enable a manipulation of the perspectives and FOVs of any identified or selected region of a three-dimensional rendering (e.g., via the operator interface 126). For instance, if a selected region includes three video cameras having a field of view of the selected region, S225 may enable a user to select one or more of the FOVs (e.g., 510) and change a perspective of the three-dimensional rendering to encapsulate the FOV of the selected camera.

Additionally, S225 may enable a user to (e.g., via the operator interface 126) spatially explore or travel along or between different regions of the three-dimensional rendering. Different regions of a three-dimensional rendering may be defined in any suitable manner and preferably, based on the FOVs of the image capturing devices within regions of the three-dimensional rendering.

Additionally, S225 may enable spatial exploration (e.g., via the operator interface 126) that functions to enhance scene comprehension detection in a selected region. That is, selection of a selected region of the three-dimensional rendering to explore (e.g., via the operator interface 126) may trigger a system implementing the method 200 to increase a scene comprehension of the selected region (e.g., 530) by changing a mode of a scene comprehension machine learning model from a first scene comprehension mode to an enhanced scene comprehension mode that is capable of improved analysis and interpretive comprehension of the physical activities taking place within the selected region.

Accordingly, the three-dimensional rendering generated by the comprehension system 120 may include one or more representations of actives, entities, objects, noteworthy locations within the predefined area, blind spots and the like. With respect to the blind spots illustrated within the three-dimensional rendering (e.g., 599 shown in FIG. 5A), a system implementing the method 200 may function to simulate entities entering or being positioned within the blind spots of the three-dimensional rendering based on an evaluation of movements of those entities and predicting their positions within the three-dimensional rendering.

In some embodiments, S220 includes tracking movement of entities across sensing areas of different sensors. In some embodiments, the semantic module identifies entities within image data frames from each of the image data sources (e.g., 110), and compares entities detected across the image data frames to determine whether multiple cameras are imaging the same entity. In some embodiments, the semantic module 121 accesses image data frames of a plurality of cameras with overlapping FOVs (e.g., 501 and 502), detects entities in corresponding frames of the plurality of cameras, and for each detected entity, extracts semantic information for each entity across the frames of the plurality of cameras, and correlates the extracted information for each entity. In this manner, the semantic module 121 generates semantic information for a single entity by using image data from each camera that images the entity at a same time. In some embodiments, the semantic information generated for an entity across sensors (e.g., cameras) includes information associated with the sensors used to generate the semantic information. For example, if a person is located within sensing area 510 (shown in FIG. 5A), the semantic module 121 generates semantic information that identifies the cameras sensing the person. Accordingly, movement of an entity within the rendering can be tracked by tracking change in sensors (cameras) sensing the person across time. For example, if the semantic module 121 determines that a person is identified by image data of cameras 501 and 502 at a first point in time, and then at a later time the person is only imaged by camera 502, then the semantic module 121 can identify the movement of the person as being in a direction towards the camera 502. In this manner, trajectory of a tracked entity can be determined.

In some embodiments, the comprehension system 120 tracks movement of entities across blind spots. In some embodiments, the comprehension system 120 generates semantic information and determines a trajectory of a tracked entity while the entity is within a first sensing area (e.g., 510) of a first image data source (e.g., camera) (by using image data of the first image data source); when the entity leaves the first sensing area and enters a blind spot (e.g., 598), the comprehension system 120 estimates location based on the determined trajectory; when the estimated location of the entity corresponds to a location within a second sensing area (e.g., 597) of a second image data source, the comprehension system 120 compares the semantic information previously generated for the entity (by the semantic module 121) with semantic information generated from the image data of the second image data source to identify semantic information of the second image data source that corresponds to the tracked entity; and the comprehension system combines the matching semantic information generated from the second image data source with the semantic information previously generated form the first image data source. For example, if the semantic information previously generated from the first image data source identifies the entity as an attacker, and semantic information of the second image data source matches the semantic information previously generated for the entity from the first image data source, then the comprehension system 120 determines that the attacker has moved from the sensing area of the first image data source to the sensing area of the second image data source. For example, if semantic information for the entity (as determined by a first camera) identifies the entity as a person with a mask, beard, green jacket, and gun, and the person moves to the FOV of another camera (either directly or via a blind spot), and semantic information generated by the second camera includes a description of a person with a mask, beard, green jacket, and gun, then the comprehension system 120 determines that this is the same person detected by the first camera, and therefore can update the rendering accordingly.

S230, which includes generating a live situational awareness feed (e.g., 550 shown in FIG. 5B), functions to use at last one of the semantic module 121 and the event detection module 124 to interpret scenes captured by the image capturing devices and present a real-time comprehension of the scenes. In some embodiments, at last one of the semantic module 121 and the event detection module 124 interprets scenes captured by the image capturing devices and presents a real-time comprehension of the scenes by using information generated at S220 (and optionally S215), which is associated with locations within the rendering. In some embodiments, the semantic module 121 is implemented by the method 200 described in U.S. Patent Application No. 62/563,510, which is incorporated by reference in its entirety.

Accordingly, S230 may function to generate a natural (or formal) language description (e.g., 571, 572) of a scene illustrated within the three-dimensional rendering (e.g., 561, 562) by using a trained model that functions to generate one or more scene stories and/or descriptions about one or more activities occurring in a scene. In some embodiments, the trained model is a trained language model. In some embodiments, the trained model functions to input identifying one or more activities occurring in a scene and output a natural language description of the identified one or more activities.

The live situational awareness feed generated in S230 may include probabilities of threat, emergency, or injury in a scene which may correspond to one or more events detected by the semantic module 121 and illustrated within the three-dimensional rendering (via visual representations within the rendering that represent the detected events). The live situational awareness feed may additionally indicate an actual security threat, emergency, or injury and/or any other relevant detected events.

In some embodiments, at least one of the operator interface 126 and the administrator interface 125 provides the situational awareness feed to a user interface system 130. In some embodiments, the comprehension system 120 includes the live situational awareness feed in a user interface provided to a user interface device 130.

Figure 5B:
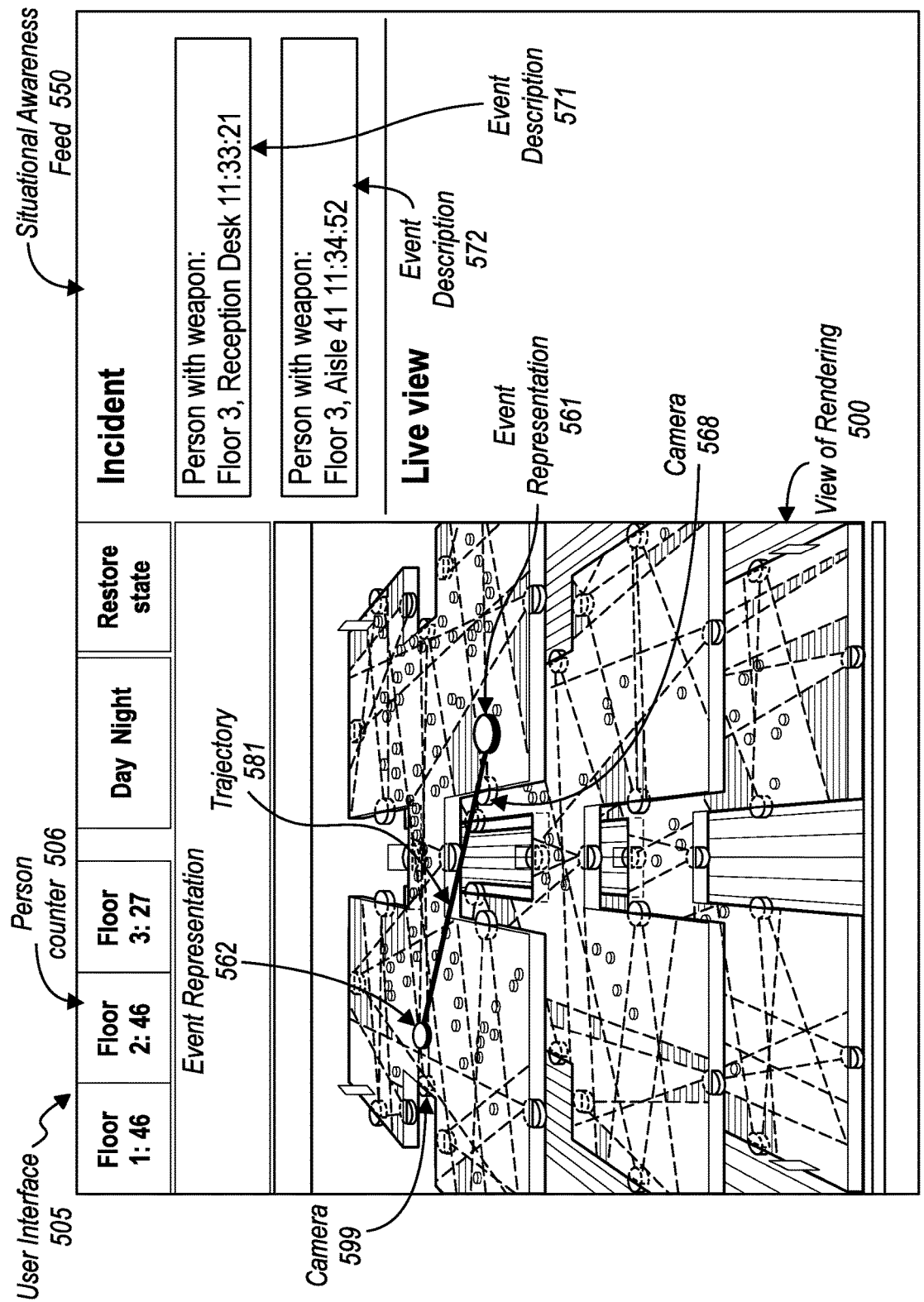
Figure 5C:
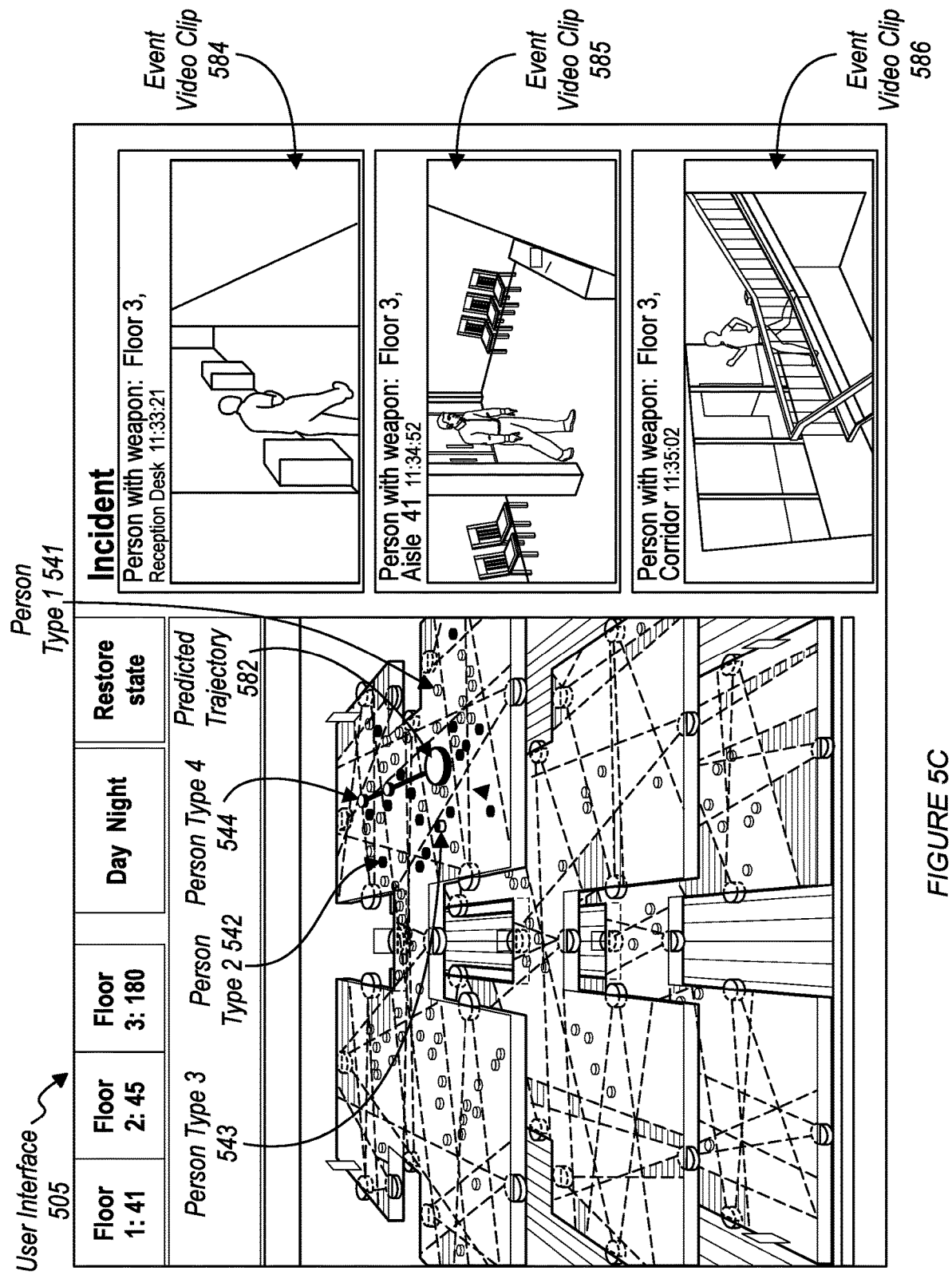

As shown in FIG. 5B, the user interface 505 includes the rendering view 500 and the situational awareness feed 550. The situational awareness feed 550 includes event description 571 (at time 11:33:21) that corresponds to event representation 561 in the rendering 500, and event description 572 (at time 11:34:52) that corresponds to event representation 562 in the rendering 500. The rendering 500 includes a visual representation of a trajectory 581 of the event represented by 561 and 562. In some embodiments, the comprehension system 120 compares the semantic information generated by the semantic module 121 at time 11:33:21 by using image data of the camera 568 (e.g., "person with weapon: Floor 3, Reception Desk") with semantic information generated by the semantic module 121 at time 11:34:52 by using image data of the camera 569 (e.g., "person with weapon: Floor 3, Aisle 41") to associate the event detected at 561 (e.g., by the event detection module 124) with the event detected at 562, and thereby determine the trajectory represented by 581.

In some embodiments, a visual representation of the live situational awareness feed is superimposed onto the view of the three-dimensional rendering that is included in the user interface.

In some embodiments, the live situational awareness feed is provided to the user interface system as an audible output.

In some embodiments, the live situational awareness feed is presented in the user interface (e.g., 505) as a user interface element (e.g., 550) separate from a user interface element that includes the three-dimensional rendering (e.g., 500). For instance, the live situational awareness feed may be presented in distinct display or other output device than the three-dimensional rendering of a predefined area. In such embodiments, the live situational awareness feed may present an alert to a user, such as blinking text of the feed in red and correspondingly, redirecting a user three-dimensional view (of the rendering) in which the subject of the feed is also blinking in red in the three-dimensional rendering.

In some embodiments, the live situational awareness feed may be combined with a corresponding region or illustration within the three-dimensional rendering such that the feed overlaps or is presented immediately adjacent to a given display of the region.

S240, which includes detecting an incident (or unusual events or anomalies) within the predefined space, functions to detect incidents or critical events within the predefined space by using at least one of the contextual metadata (e.g., stored in module 127) and the semantic information generated by the semantic module 121, and the associated locations within the rendering of the predefined space. For example, detection of an action of a person swinging a knife in an area of the predetermined space that is identified as a kitchen (by the contextual metadata) might not cause triggering of a critical event alert (since such an action can be associated with chopping food), whereas detection of an action of a person swinging a knife in an area of the predetermined space that is identified as an office (by the contextual metadata) might cause triggering of a critical event alert (since such an action can be associated with a violent attack).

In some embodiments, the event detection module 124 performs S240.

In some embodiments, S240 functions to detect incidents or critical events within the predefined space and present incident data via the live situational awareness feed (e.g., 550) and via a live situational awareness view comprising one or more regions of the three-dimensional rendering.

In a preferred embodiment, S240 may function to perform early detection of any type of threat, emergency, or critical event. A critical event may be a predefined or machine learned circumstance that may trigger an alert notification or requires a user to take some action to resolve or mitigate the critical event. Accordingly, based on activities captured by the image capturing devices and that are processed by system 120, S240 may function to perform an early detection before a situation within the predefined area escalates. For instance, S240 may function to detect an early threat of workplace violence based on detected facial features of one or more parties within a scene, a posture of a party within a scene, a detection of a weapon, and the like, as shown by way of example in FIG. 5B. In another example, S240 may function to detect an early threat of injury based on detecting unsafely secured objects within a scene including one or more active persons therein.

Once an event or situation is detected in S240, S250, which includes generating event or alert notifications, functions to provide an alert via one or more predetermined communication channels and/or via a live situational feed and a live situational view.

S250 may function to generate an event notification that may include one or more of a clip of the video (or image data) triggering the alert (e.g., 584, 585, 586 shown in FIG. 5C), a comprehension or interpretation of the scene triggering the alert (e.g., "Person with weapon: Floor 3, Reception Desk: 11:33:21"), a proposed response, and a view of the three-dimensional render (or map) identifying a location of the incident or event (e.g., 591, 592 shown in FIG. 5D).

Figure 5D:
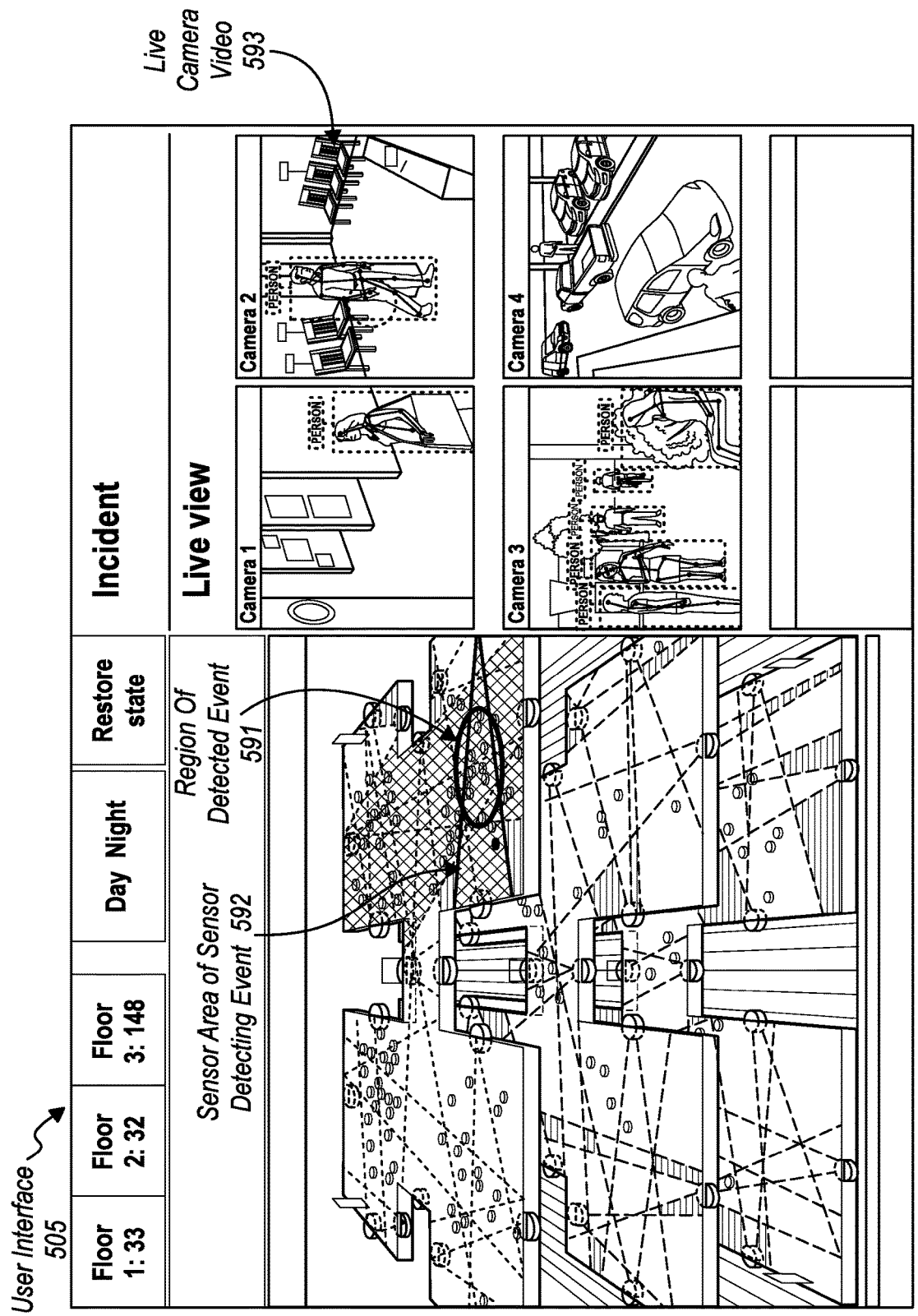

In some embodiments, the notification includes a live video stream of video triggering the alert (e.g., 593, shown in FIG. 5D). In some embodiments, semantic information generated by the semantic module 121 is superimposed onto the live video stream of video triggering the alert (e.g., 593, shown in FIG. 5D).

Once an alert is triggered (or even prior to a triggering of an alert), S250 may function to generate onto the three-dimensional rendering a tracking of one or more parties (e.g., 544) involved in the incident or to be involved within the incident. For instance, a path (e.g., 582) of an assailant (e.g., 544) through the predefined area may be illustrated via the three-dimensional rendering. Additionally, the locations of security personnel (e.g., 543) and their respective paths throughout the predefined space may be illustrated within a three-dimensional rendering.

In the case of an incident, S250 may also generate a proposed trajectory of objects (e.g., 582) or active entities (e.g., people) within the three-dimensional rendering. For instance, using the machine learning model of the scene comprehension and event detection system, S250 may be able to predict future locations or headings of one or more activities entities operating within the predefined space.

In some embodiments, S250 may generate alerts that include proposals for suggested actions to take in response to an incident. For instance, in the case of an assailant in the predefined space including a weapon, an alert notification generated by S250 may provide or illustrate an evacuation route for persons identified (e.g., trapped or injured, etc.) within the three-dimensional rendering. The alert or notification may additionally include contact information or additional information that may be useful to user in resolving or mitigating an incident triggering the alert.

S250 may additionally function to illustrate or identify the areas of incidents or detected events (e.g., 591, 592 shown in FIG. 5D) within the three-dimensional rendering by modifying a display or representation of the one or more regions of the three-dimensional rendering. For instance, S250 may function to provide an indicator, such as highlighting the region or causing the region to blink in various manners or colors within the three-dimensional rendering, as shown by way of example in FIG. 5D.

Thus, S250 enables a user to use the live situational awareness view to coordinate responses, such as security or emergency responses to active or detected incidents by dispatching available resources shown within varying views of the three-dimensional rendering.

In some embodiments, at least one of the systems 120 and 130 is implemented as single hardware devices. In some embodiments, at least one of the systems 120 and 130 is implemented as a plurality of hardware devices.

In some embodiments, a hardware device boo implementing at least one of the systems 120 and 130 includes a bus 601 that interfaces with the processors, the main memory 622 (e.g., a random access memory (RAM)), a read only memory (ROM) 604, a processor-readable storage medium 605, and a network device 611. In some embodiments, bus 601 interfaces with at least one of a display device 691 and a user input device 692.

In some embodiments, the processors 603A-603N include one or more of an ARM processor, an X86 processor, a GPU (Graphics Processing Unit), a tensor processing unit (TPU), and the like. In some embodiments, at least one of the processors includes at least one arithmetic logic unit (ALU) that supports a SIMD (Single Instruction Multiple Data) system that provides native support for multiply and accumulate operations. In some embodiments, at least one processor includes at least one hardware encoding device.

In some embodiments, at least one of a central processing unit (processor), a GPU, and a multi-processor unit (MPU) is included.

In some embodiments, the processors and the main memory form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

In some embodiments, the processing unit includes at least one arithmetic logic unit (ALU) that supports a SIMD (Single Instruction Multiple Data) system that provides native support for multiply and accumulate operations. In some embodiments the processing unit is a Central Processing Unit such as an Intel processor.

The network adapter device 611 provides one or more wired or wireless interfaces for exchanging data and commands. In some embodiments, the comprehension system 620 is communicatively coupled to at least one of an image data source and a user interface system via the network adapter device 611. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some embodiments, the processor-readable storage medium 605 of a the comprehension system 120 includes the rendering data 122 and machine-executable instructions (and related data) for an operating system 630, software programs 613, device drivers 614, and the semantic module 121. In some embodiments, the processor-readable storage medium 605 of a the comprehension system 120 includes machine-executable instructions (and related data) for at least one of a rendering module 123, an event detection module 124, a user interface module 125, an operator interface 126, an administration interface 127, and a contextual metadata module 127.

In some embodiments, the processor-readable storage medium 605 of a the comprehension system 130 includes the rendering data 122 and machine-executable instructions (and related data) for an operating system 630, software programs 613, and device drivers 614. In some embodiments, the processor-readable storage medium 605 of a the comprehension system 120 includes machine-executable instructions (and related data) for at least one of an operator user interface and an administration interface user interface.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. An enterprise video surveillance system comprising:
a plurality of video cameras positioned within a building, each camera having a different field-of-view (FOV), at least two cameras having overlapping FOVs;
a network switch coupled to the plurality of video cameras;
a comprehension system that is communicatively coupled to the plurality of video cameras via the network switch and that includes a rendering of the building, a knowledge graph that stores contextual information for the rendering, and a user interface that includes a visual representation of the rendering superimposed with visual representations of at least a portion of the contextual information and semantic information generated by the comprehension system from image data of the plurality of cameras; and
a user interface system that receives the user interface from the comprehension system via the network switch and displays the user interface.

2. The system of claim 1, wherein the contextual information includes, for each camera, a location and orientation of the camera within a coordinate space of the rendering and information identifying a field-of-view (FOV) of the camera.

3. The system of claim 2, further comprising a rendering module that generates the rendering and updates the rendering to include semantic information and contextual information.

4. The system of claim 3, wherein semantic information includes at least one of: an identification of at least one object included in image data of at least one of the plurality of cameras, information describing a relationship between at least two identified objects included in image data of at least one of the plurality of cameras, and information describing an activity of at least one object included in image data of at least one of the plurality of cameras.

5. The system of claim 4, wherein the contextual information describes at least one location within the coordinate space of the rendering.

6. The system of claim 5, wherein the comprehension system comprises a semantic module that includes a high-level feature detector, a multi-feature detection machine-learning ensemble, a condenser, and a story generator, wherein the high-level feature detector is constructed to provide high-level feature output to the ensemble, wherein the ensemble is constructed to provide feature outputs from a plurality of sub-models to the condenser, wherein the condenser is constructed to provide at least one relationship vector to the scene story generator, and wherein the scene story generator includes a trained language machine learning model that outputs a description based on at least on relationship vector, the description being semantic information.

7. The system of claim 5, wherein the comprehension system comprises a semantic module that includes a multi-task model core that instructed to perform native video deep learning on video data received by a plurality of video cameras, and generate semantic information by processing video from multiple streams locally, and in real-time.

8. The system of claim 1, wherein the contextual information comprises camera fields-of-view, wherein the camera fields-of-view are superimposed on the visual representation of the rendering.

9. The system of claim 1, further comprising an event detection module that detects an event based on the contextual information and the semantic information.

10. The system of claim 9, wherein a visual representation of the event is superimposed on the visual representation of the rendering.

11. The system of claim 1, wherein the contextual information comprises spatial identifiers.

\* \* \* \* \*